US010567596B2

(12) United States Patent
    Shiota

(10) Patent No.: US 10,567,596 B2
(45) Date of Patent: *Feb. 18, 2020

(54) IMAGE READING APPARATUS

(71) Applicant: SEIKO EPSON CORPORATION, Tokyo (JP)

(72) Inventor: Takayuki Shiota, Kitakyushu (JP)

(73) Assignee: Seiko Epson Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/018,408

(22) Filed: Jun. 26, 2018

(65) Prior Publication Data

US 2019/0007563 A1 Jan. 3, 2019

(30) Foreign Application Priority Data

Jun. 29, 2017 (JP) ................. 2017-127615

(51) Int. Cl.
    *H04N 1/04* (2006.01)
    *H04N 1/00* (2006.01)

(52) U.S. Cl.
    CPC ..... *H04N 1/00037* (2013.01); *H04N 1/00639* (2013.01); *H04N 1/00689* (2013.01)

(58) Field of Classification Search
    CPC ........... H04N 1/00037; H04N 1/00689; H04N 1/00639
    USPC ...................................................... 358/498
    See application file for complete search history.

(56) References Cited

U.S. PATENT DOCUMENTS

| 5,087,027 | A | 2/1992 | Acquaviva |
| 5,646,794 | A | 7/1997 | Lindsay et al. |
| 9,617,097 | B2* | 4/2017 | Link ................ B65H 43/04 |
| 2004/0129771 | A1 | 7/2004 | Landwehr et al. |
| 2016/0185544 | A1 | 6/2016 | Link et al. |
| 2017/0126914 | A1 | 5/2017 | Koyanagi |
| 2019/0002230 | A1 | 1/2019 | Shiota |

FOREIGN PATENT DOCUMENTS

| CN | 1494707 | 5/2004 |
| JP | 09-077282 A | 3/1997 |
| JP | 2006-311052 A | 11/2006 |
| JP | 2019-012990 | 1/2019 |
| TW | 2017-15875 | 5/2017 |

* cited by examiner

*Primary Examiner* — Cheukfan Lee
(74) *Attorney, Agent, or Firm* — Workman Nydegger

(57) ABSTRACT

There is provided an image reading apparatus including: a reading unit that reads a document; a document transport unit that transports the document toward the reading unit; a binding member detector that detects a binding member binding the document by detecting a change in a magnetic field when the document passes through the magnetic field; a document detector that detects passage of the document when the document passes through the binding member detector; and a controller that receives information on the document detected by the document detector and information on the change in the magnetic field detected by the binding member detector, in which in a case where the binding member detector detects the change in the magnetic field in a document undetected state in which the document detector does not detect the passage of the document, the controller executes a predetermined process.

10 Claims, 18 Drawing Sheets

IMAGE READING APPARATUS

BACKGROUND

1. Technical Field

The present invention relates to an image reading apparatus which reads a document.

2. Related Art

In an image reading apparatus represented by a scanner, in some case, a user mistakenly sets a document bundle stapled as it is and a feeding job is started. In this case, it is concerned that there is a problem that stapled portions of transported documents are torn.

In view of the problem, JP-A-9-077282 discloses a document feeding apparatus including a non-contact metal detector for detecting a binding needle in an upstream portion in a document transport direction rather than a transport roller for separating the documents one by one and transporting the documents. In JP-A-9-077282, when the metal detector detects the binding needle after rotation of the transport roller, that is, a document feeding operation is started, the document feeding apparatus stops to drive the transport roller or the like.

In the related art, various types of metal detectors are proposed. For example, generally, a magnetic field generating coil which generates a magnetic field and a magnetic field receiving coil which receives the magnetic field are disposed to face each other. When an object to be detected is passed through between the magnetic field generating coil and magnetic field receiving coil, a change in the magnetic field is detected to detect a metal object.

Therefore, when the document feeding apparatus is installed at a place affected by the magnetic field, the effect of the magnetic field may become a disturbance noise and the disturbance noise may have a bad influence on detection accuracy of the binding needle in the document feeding apparatus.

On the other hand, the magnetic field generated by the metal detector itself may have a bad influence on the document feeding apparatus and peripherals of the document feeding apparatus.

SUMMARY

An advantage of some aspects of the invention is to provide an image reading apparatus which appropriately detects a binding member in consideration of an influence of a disturbance noise.

According to an aspect of the invention, there is provided an image reading apparatus including: a reading unit that reads a document; a document transport unit that transports the document toward the reading unit; a binding member detector that detects a binding member binding the document by detecting a change in a magnetic field when the document passes through the magnetic field; a document detector that detects passage of the document when the document passes through the binding member detector; and a controller that receives information on the document detected by the document detector and information on the change in the magnetic field detected by the binding member detector, in which in a case where the binding member detector detects the change in the magnetic field in a document undetected state in which the document detector does not detect the passage of the document, the controller executes a predetermined process.

In this case, in the document undetected state in which the document detector does not detect the passage of the document, in a case where the binding member detector detects the change in the magnetic field, that is, a case where the disturbance noise is detected, the controller performs the predetermined process, so that it is possible to more accurately detect the binding member.

"Predetermined process" is not limited to control of components of the image reading apparatus by the controller, but also includes a process such as calculation inside the controller, that is, an invisible process other than a process of which a processing result is visible from an outside.

In the image reading apparatus according to the aspect of the invention, it is preferable that the predetermined process be to perform notification of a warning.

In this case, since the warning is notified in the case where the disturbance noise is detected, it is possible to urge a user to perform a retry operation and it is further possible to appropriately detect the binding member.

In the image reading apparatus according to the aspect of the invention, it is preferable that the binding member detector be configured to include a magnetic field generating coil that generates the magnetic field and a magnetic field receiving coil that receives the magnetic field generated by the magnetic field generating coil, and the binding member detector detect the change in the magnetic field in the document undetected state in a state in which the magnetic field generating coil stops to form the magnetic field.

In this case, since the binding member detector detects the change in the magnetic field in the document undetected state in a state in which the magnetic field generating coil stops to form the magnetic field, it is possible to more reliably detect the change in the magnetic field in the document undetected state.

In the image reading apparatus according to the aspect of the invention, it is preferable that the document detector be configured to include a first document detector on an upstream side and a second document detector on a downstream side of a detection position at which the binding member detector detects the binding member in a moving direction of the document to the binding member detector, and the controller calculate a size of an object to be detected by the binding member detector in the moving direction based on the information on the document detected by the document detector and the information on the change in the magnetic field detected by the binding member detector.

In this case, since the document detector is configured to include the first document detector on the upstream side of the detection position of the binding member detector and the second document detector on the downstream side of the detection position, it is possible to calculate a passage speed of the document at the detection position. Since the controller obtains the size of the object detected by the binding member detector in the moving direction based on the information (that is, passage speed of document) on the document detected by the document detector and the information on the change in the magnetic field detected by the binding member detector, it is possible to distinguish between the object (for example, aluminum seal) with which the document is normally transported and read in the image reading apparatus and the object (for example, binding member) with which the document is not normally transported and read in the image reading apparatus and to effectively use a result for later control.

In the image reading apparatus according to the aspect of the invention, it is preferable that the binding member detector cause the magnetic field generating coil to form the magnetic field after the first document detector detects the document.

In this case, since the binding member detector causes the magnetic field generating coil to form the magnetic field after the first document detector detects the document, it is possible to minimize the magnetic field formed by the magnetic field generating coil. Accordingly, it is possible to suppress that the magnetic field has a bad influence on the image reading apparatus or a peripheral of the image reading apparatus.

In the image reading apparatus according to the aspect of the invention, it is preferable that the binding member detector cause the magnetic field generating coil to stop forming the magnetic field after the document undetected state in which both of the first document detector and the second document detector do not detect the document.

In this case, since the binding member detector causes the magnetic field generating coil to stop forming the magnetic field after the document undetected state in which both of the first document detector and the second document detector do not detect the document, it is possible to minimize the magnetic field formed by the magnetic field generating coil. Accordingly, it is possible to suppress that the magnetic field has a bad influence on the image reading apparatus or the peripheral of the image reading apparatus.

In the image reading apparatus according to the aspect of the invention, it is preferable that in a case where a time difference between a timing at which the first document detector detects the document and a timing at which the second document detector detects the document is smaller than a first time period, the controller perform notification of the warning.

In a case where the time difference between the timing at which the first document detector detects the document and the timing at which the second document detector detects the document is smaller than the first time period, that is, a case where the passage speed of the document in the binding member detector is too fast, it is concerned that the binding member is not appropriately detected. In this case, since the warning is notified in such a case, it is possible to urge the user to perform the retry operation and it is further possible to appropriately detect the binding member.

In the image reading apparatus according to the aspect of the invention, it is preferable that in a case where the second document detector does not detect the document within a second time period after the first document detector detects the document, the controller notify a warning.

In a case where the second document detector does not detect the document within the second time period after the first document detector detects the document, for example, it is concerned that the document is not correctly passed through the detecting region by the binding member detector. In this case, since the warning is notified in such a case, it is possible to urge the user to perform the retry operation and it is further possible to appropriately detect the binding member.

According to another aspect of the invention, there is provided an image reading apparatus including: a reading unit that reads a document; a document transport unit that transports the document toward the reading unit; and a binding member detector that detects a binding member binding the document by detecting a change in a magnetic field, in which the binding member detector includes a first portion and a second portion disposed to face the first portion and is configured to detect the binding member by passing the document through between the first portion and the second portion and to be capable of adjusting an interval between the first portion and the second portion.

In this case, since the binding member detector includes the first portion and the second portion disposed to face the first portion and is configured to detect the binding member by passing the document through between the first portion and the second portion and to be capable of adjusting the interval between the first portion and the second portion, by adjusting the interval, it is possible to adjust an output (for example, magnetic field formed by magnetic field generating coil) so as to detect the binding member. As a result, for example, by decrease the interval, it is possible to weaken the magnetic field and to suppress that the magnetic field has a bad influence on the image reading apparatus or the peripheral of the image reading apparatus.

In the image reading apparatus according to the aspect of the invention, it is preferable the apparatus further include an interval measuring unit that measures the interval, in which the binding member detector includes a magnetic field generating coil that generates the magnetic field and adjust an intensity of the magnetic field based on the interval measured by the interval measuring unit.

In this case, the image reading apparatus includes the interval measuring unit that measures the interval. Since the binding member detector includes the magnetic field generating coil that generates the magnetic field and adjusts the intensity of the magnetic field based on the interval measured by the interval measuring unit, by setting the intensity of the magnetic field according to the interval, it is possible to prevent the magnetic field from being stronger than necessary and to suppress that the magnetic field has a bad influence on the image reading apparatus or the peripheral of the image reading apparatus.

In the image reading apparatus according to the aspect of the invention, it is preferable an apparatus main body including the reading unit be provided integrally with the binding member detector.

In this case, the apparatus main body including the reading unit is provided integrally with the binding member detector and the same operational effects as the aspects of the invention are obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
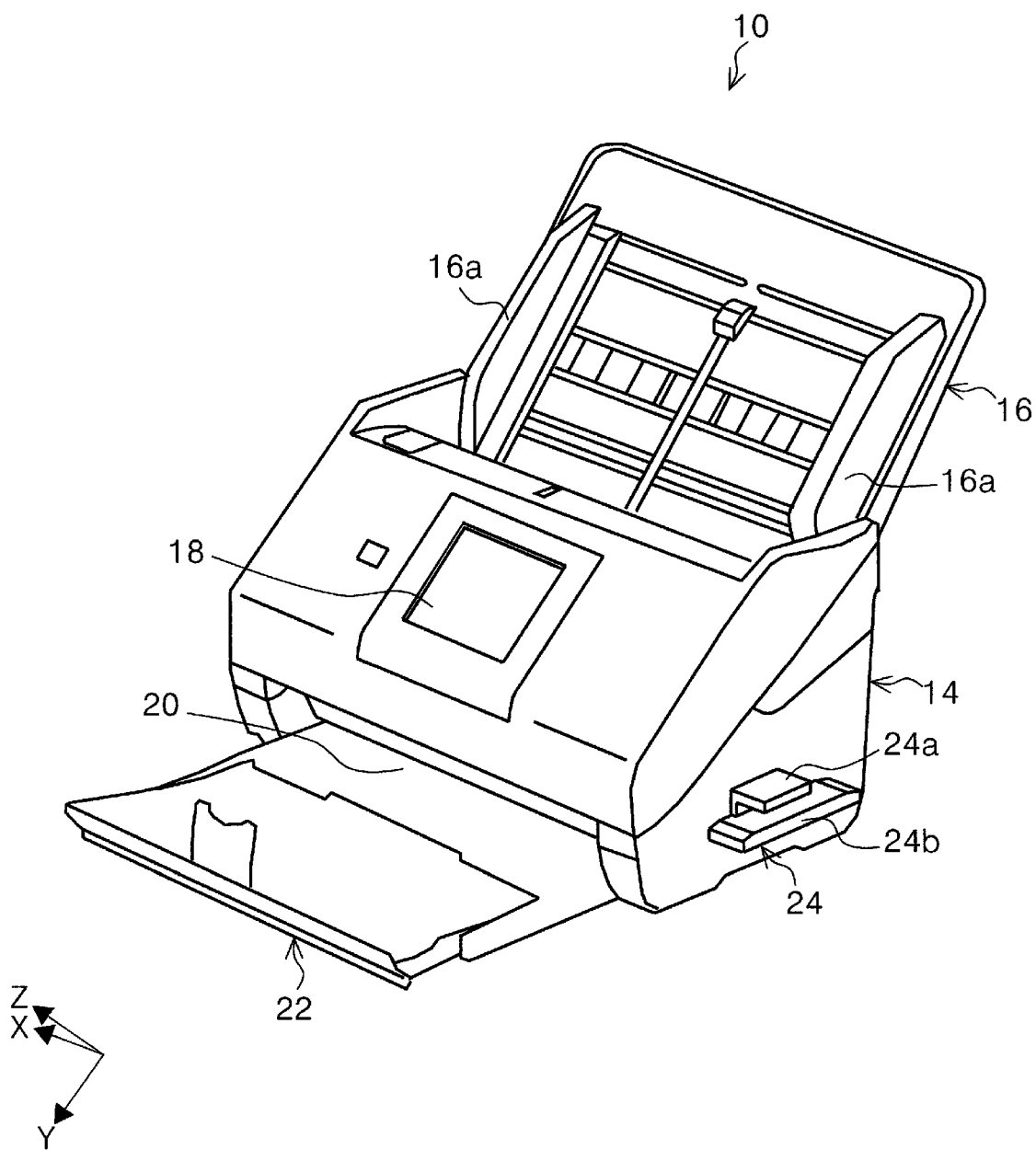
FIG. 1 is an external perspective view of a scanner according to the invention.

Hereinafter, embodiments of the invention will be described based on drawings. In each of the embodiments, the same components are denoted by the same reference numerals, a configuration of only the first embodiment will be described, and descriptions of configurations of the following embodiments will be omitted.

Figure 2:
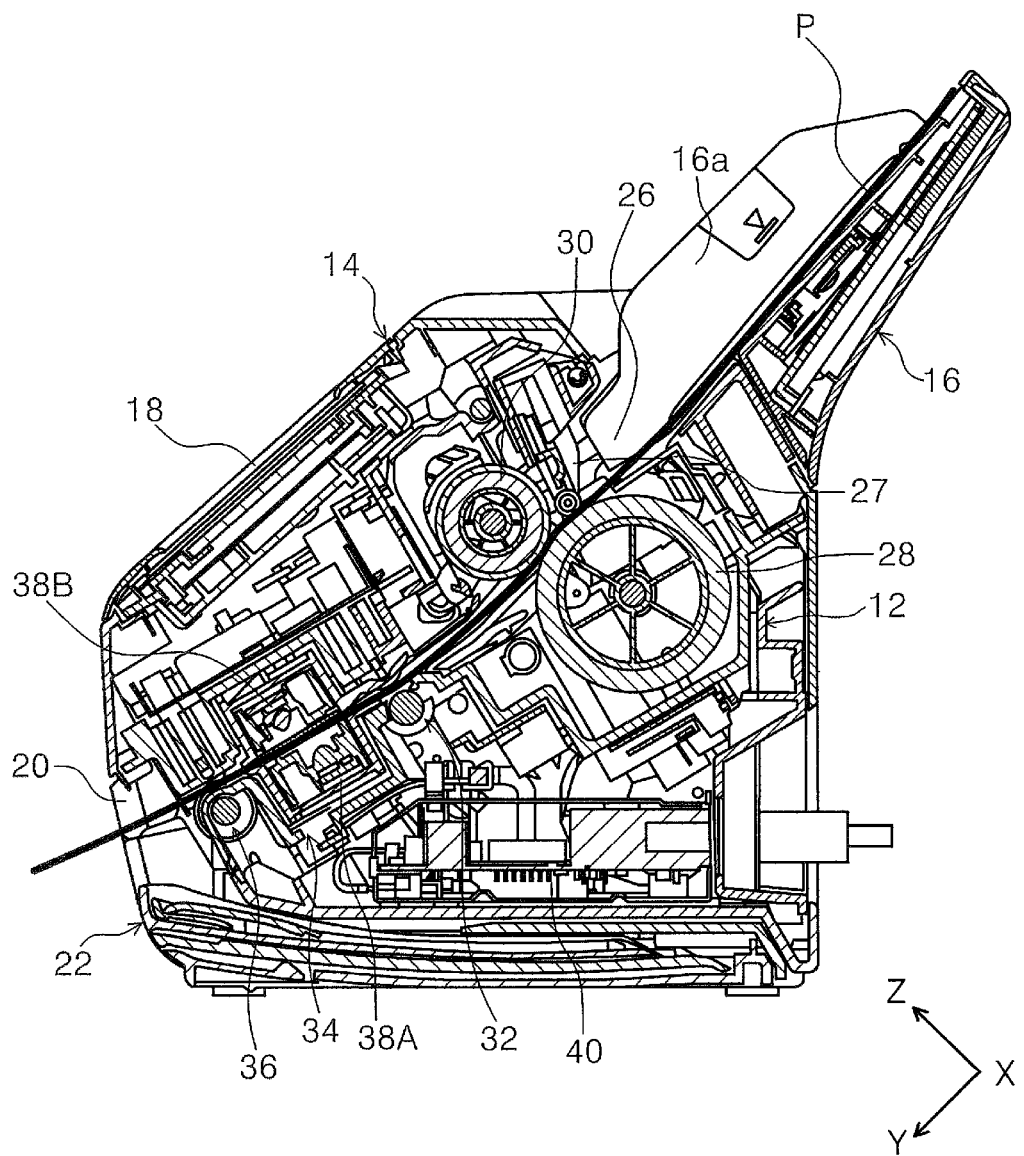
FIG. 2 is a side sectional view illustrating a document transport path of the scanner according to the invention.
Figure 3:
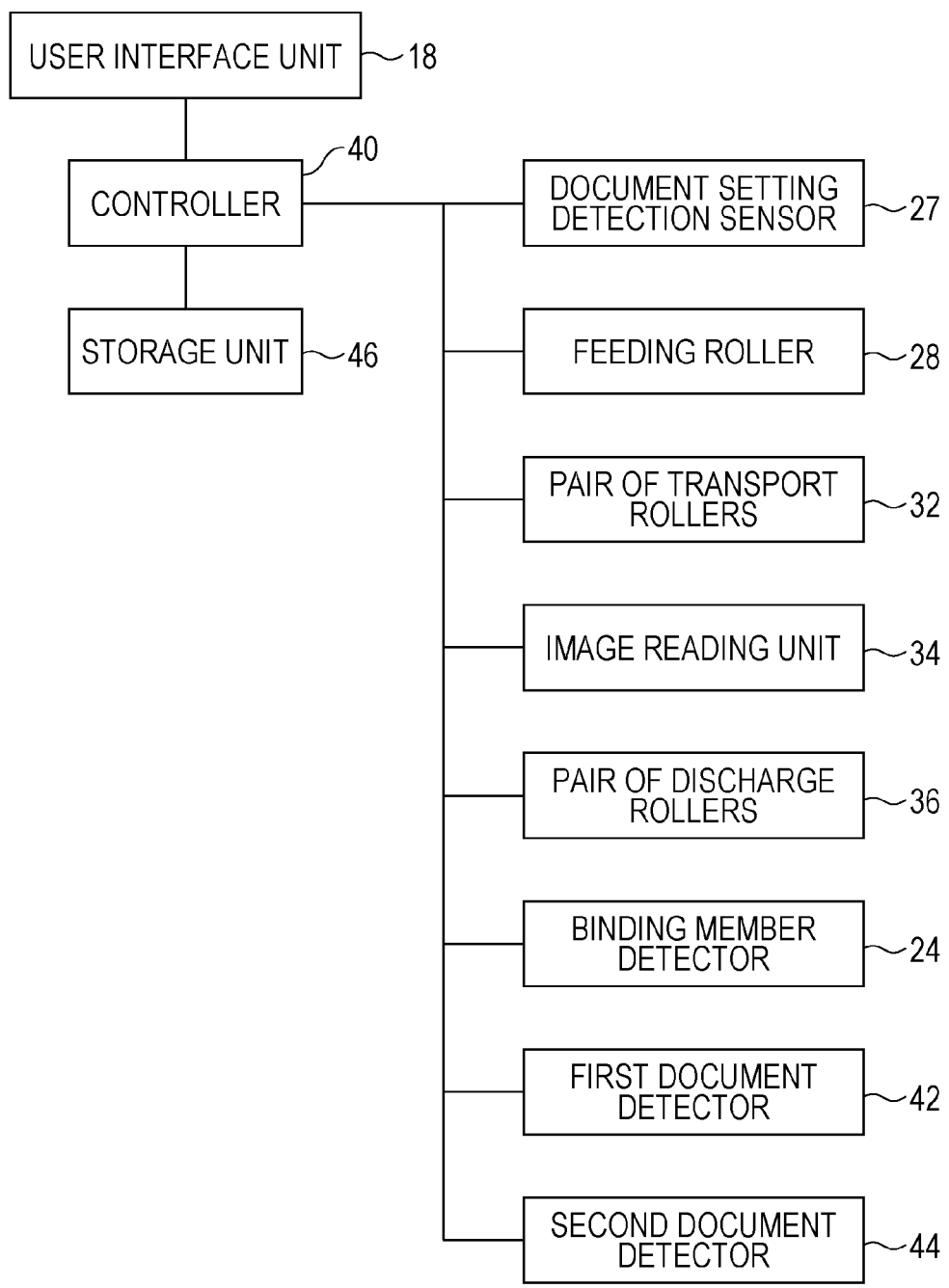
FIG. 3 is a block diagram of the scanner according to the invention.
Figure 4:
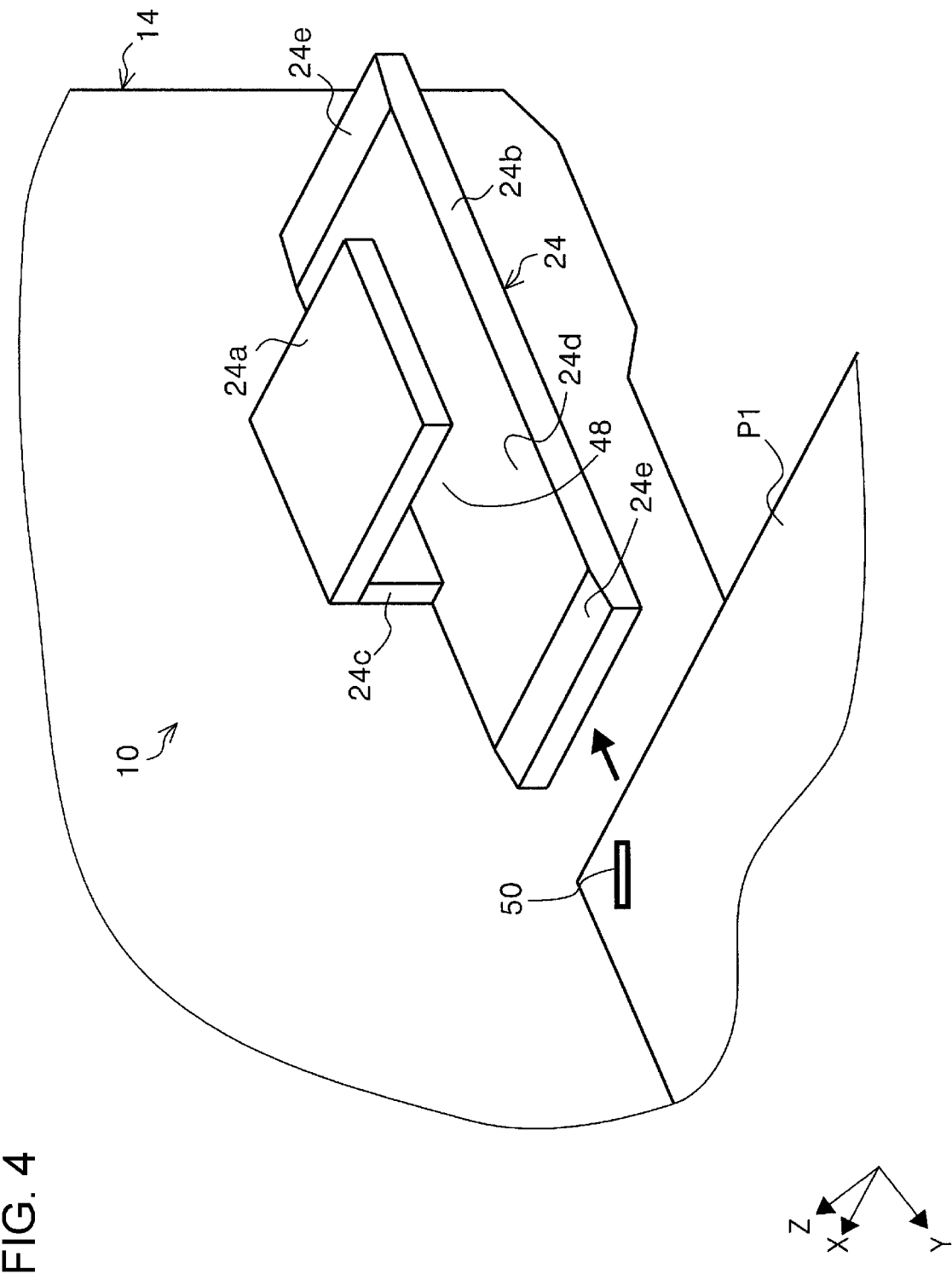
FIG. 4 is a perspective view illustrating a binding member detector.

FIG. 1 is an external perspective view of a scanner according to the invention, FIG. 2 is a side sectional view illustrating a document transport path of the scanner according to the invention, FIG. 3 is a block diagram of the scanner according to the invention, and FIG. 4 is a perspective view illustrating a binding member detector.

Figure 5:
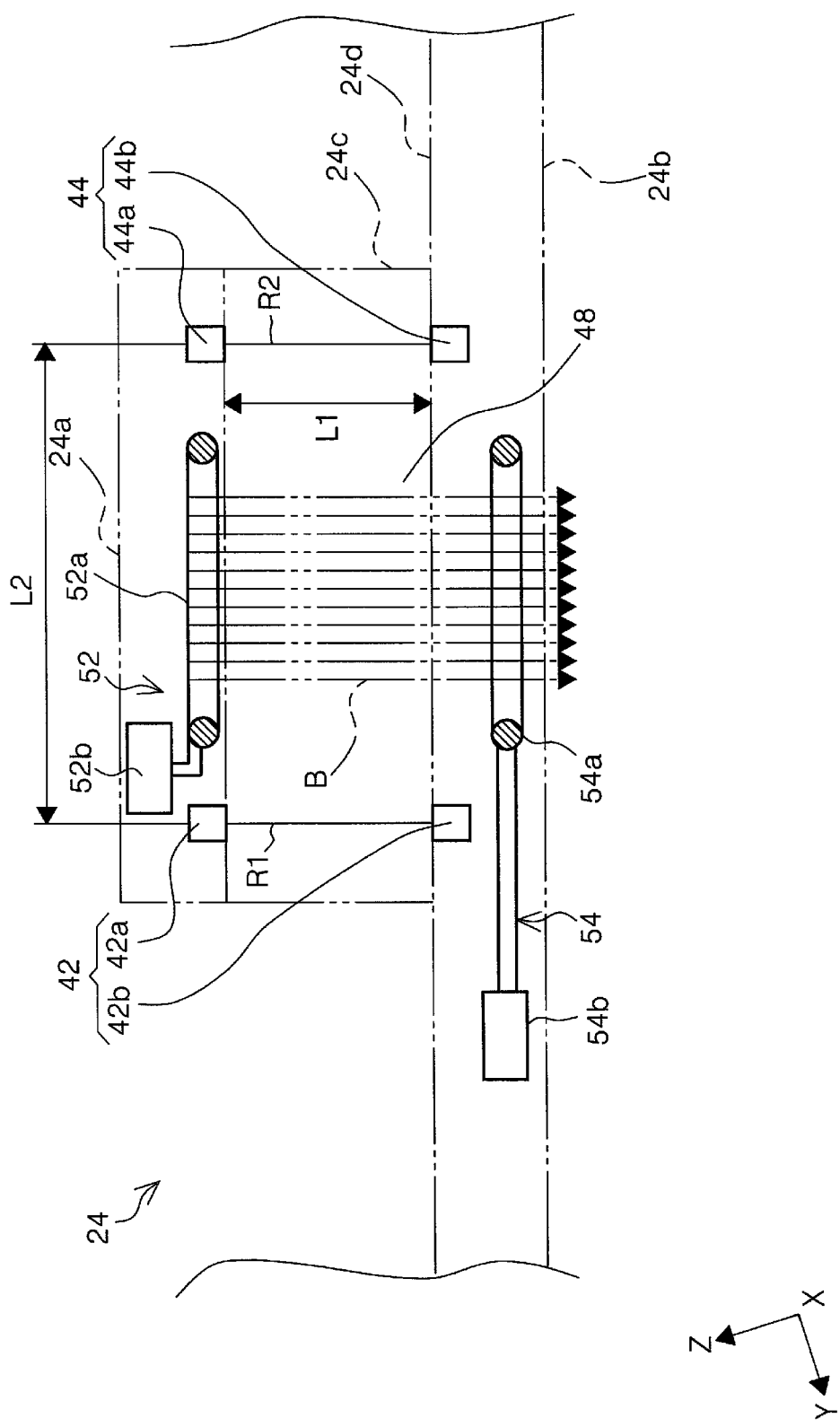
FIG. 5 is a side sectional view illustrating a configuration of the binding member detector according to the invention.
Figure 6:
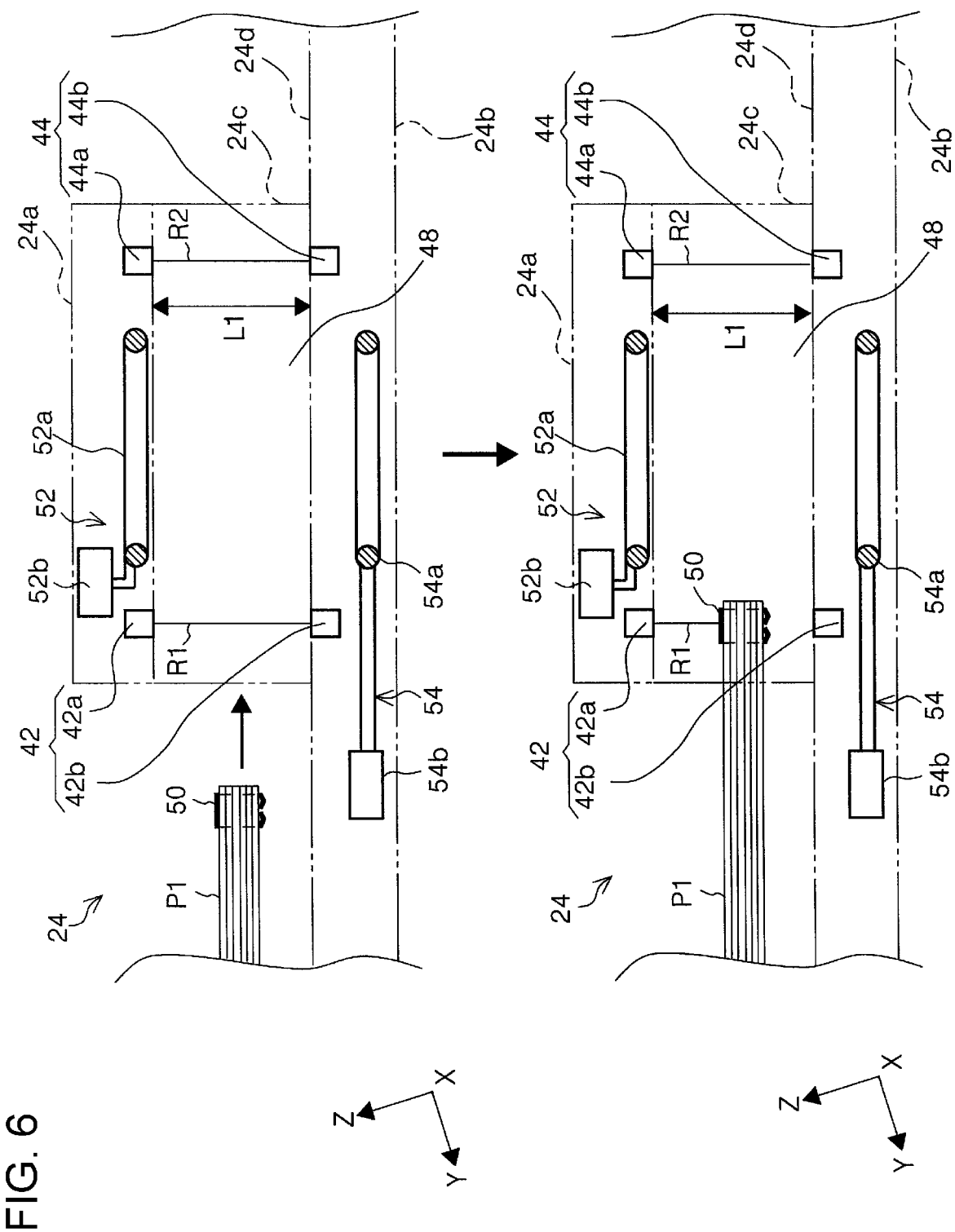
FIG. 6 is a schematic diagram illustrating a binding member detecting operation in the binding member detector.
Figure 7:
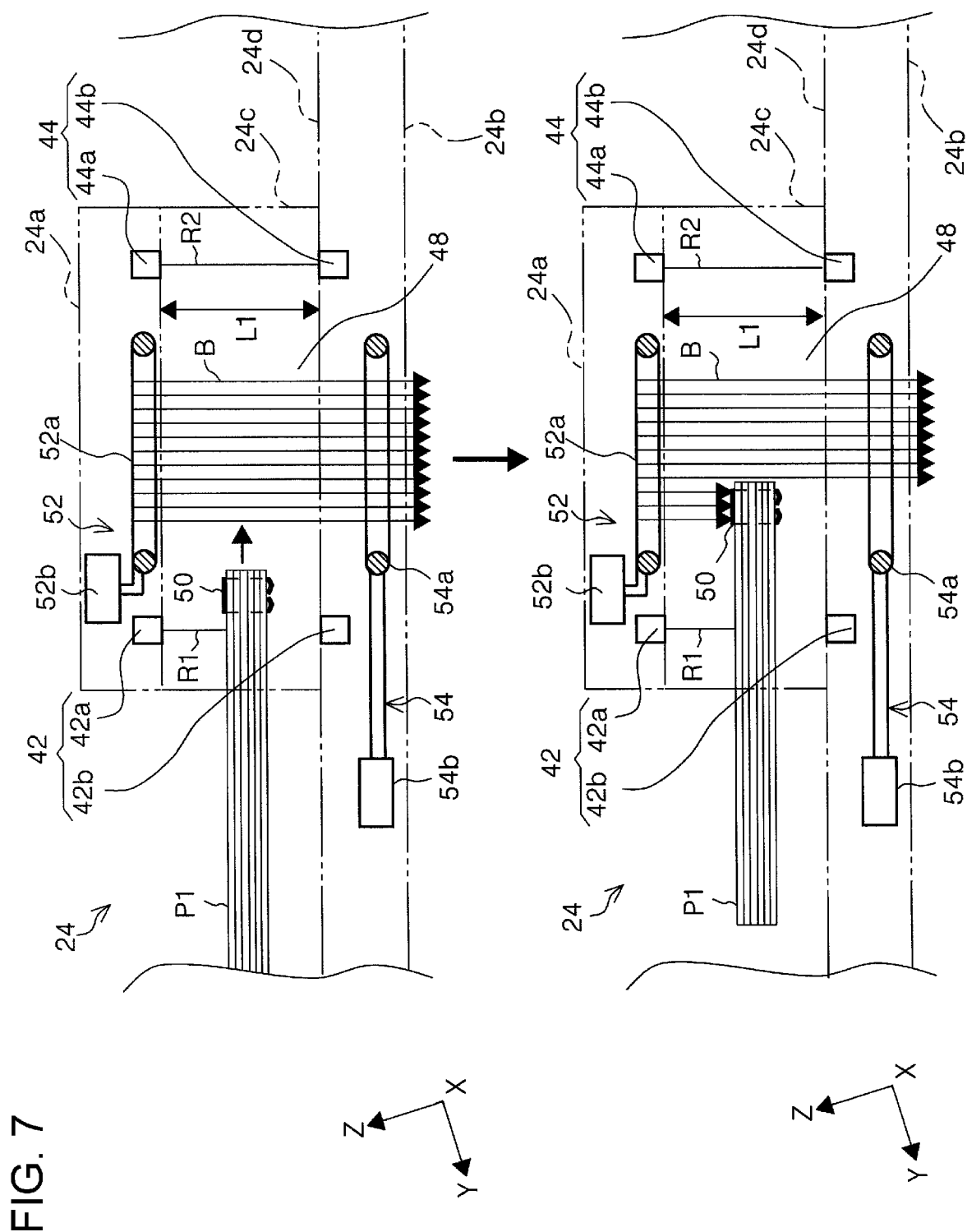
FIG. 7 is a schematic diagram illustrating the binding member detecting operation in the binding member detector.
Figure 8:
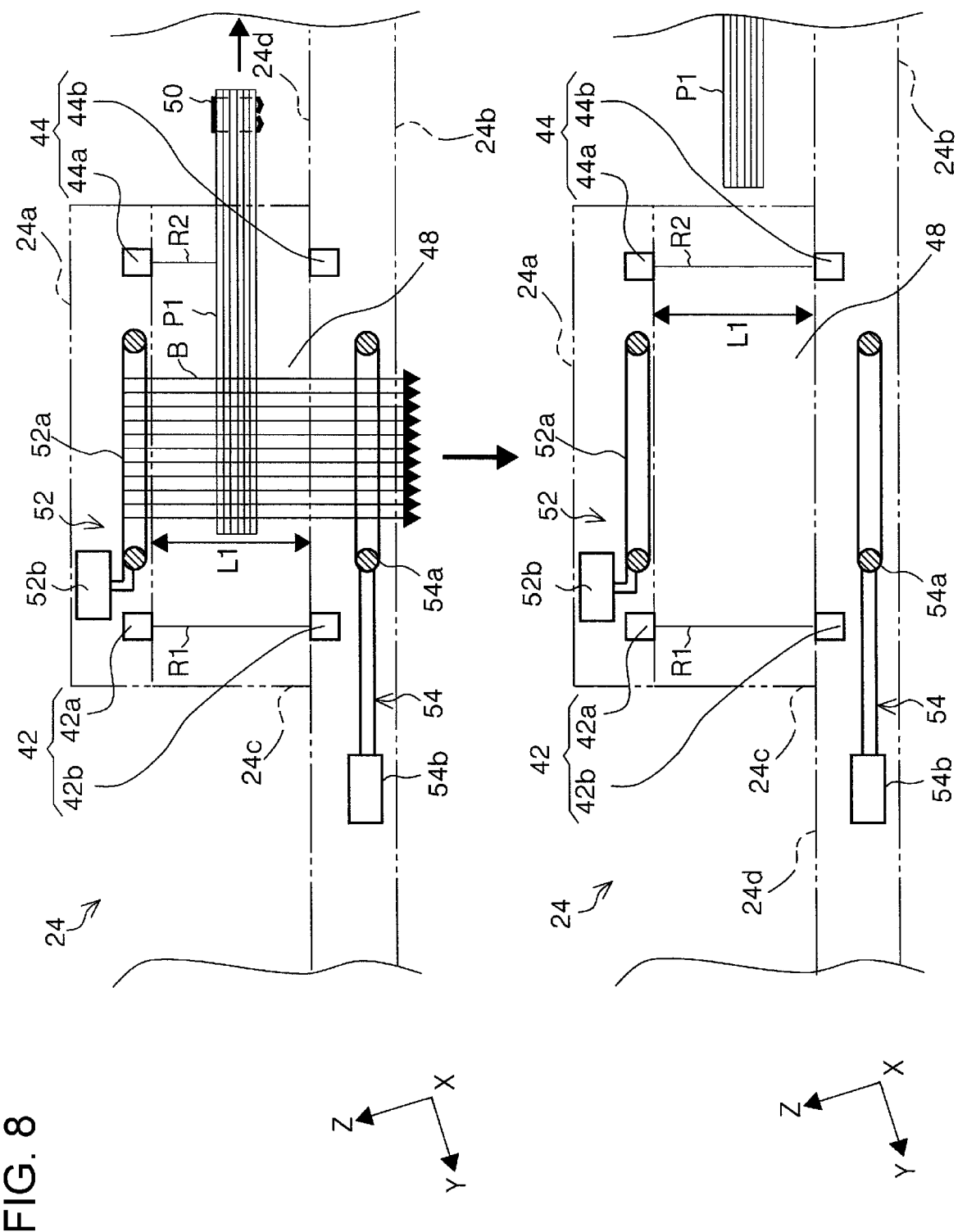
FIG. 8 is a schematic diagram illustrating the binding member detecting operation in the binding member detector.

FIG. 5 is a side sectional view illustrating a configuration of the binding member detector according to the invention, FIG. 6 is a schematic diagram illustrating a binding member detecting operation in the binding member detector, FIG. 7 is a schematic diagram illustrating the binding member detecting operation in the binding member detector, and FIG. 8 is a schematic diagram illustrating the binding member detecting operation in the binding member detector.

Figure 9:
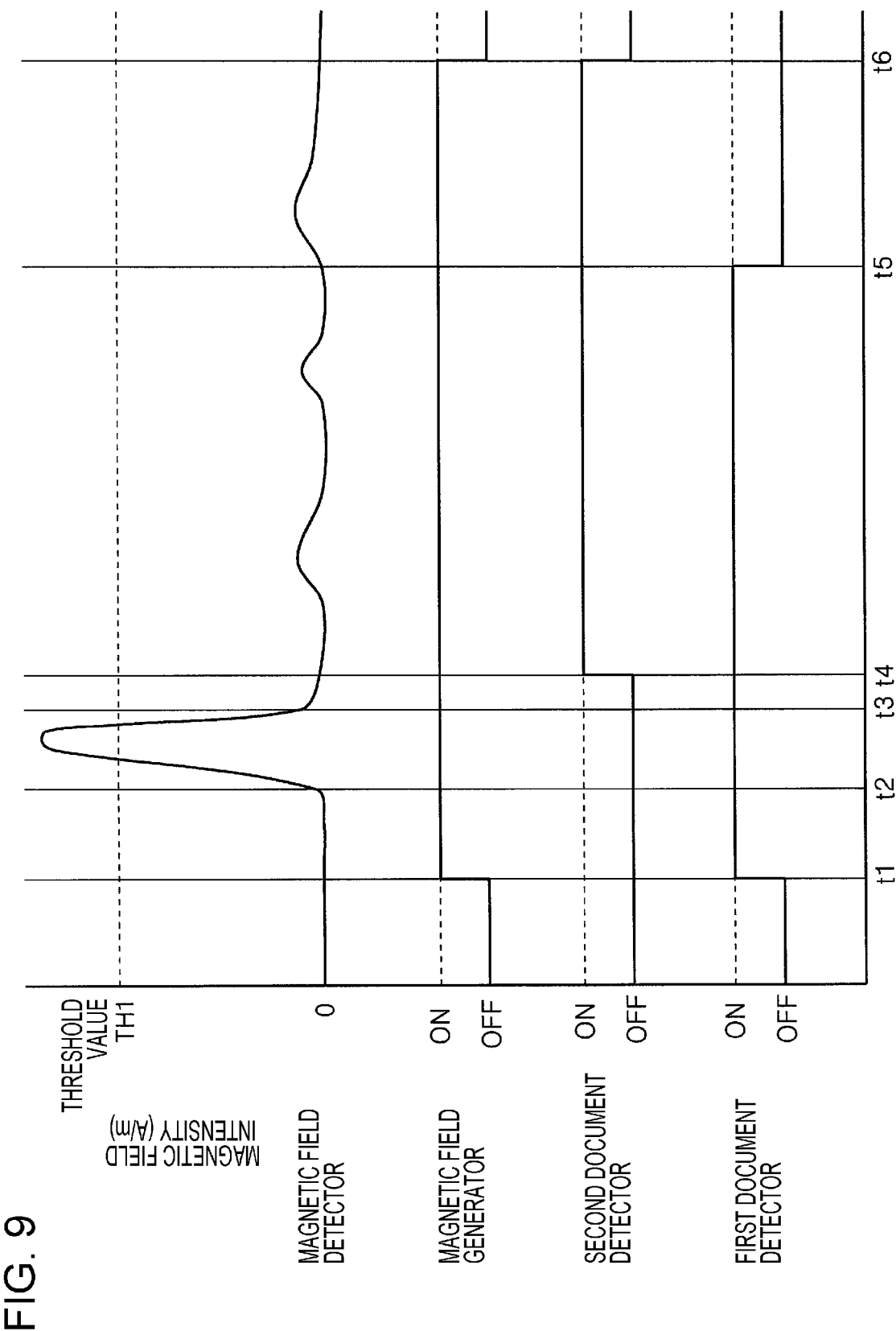
FIG. 9 is a time chart illustrating a state in which a binding member is detected in the binding member detecting operation.
Figure 10:
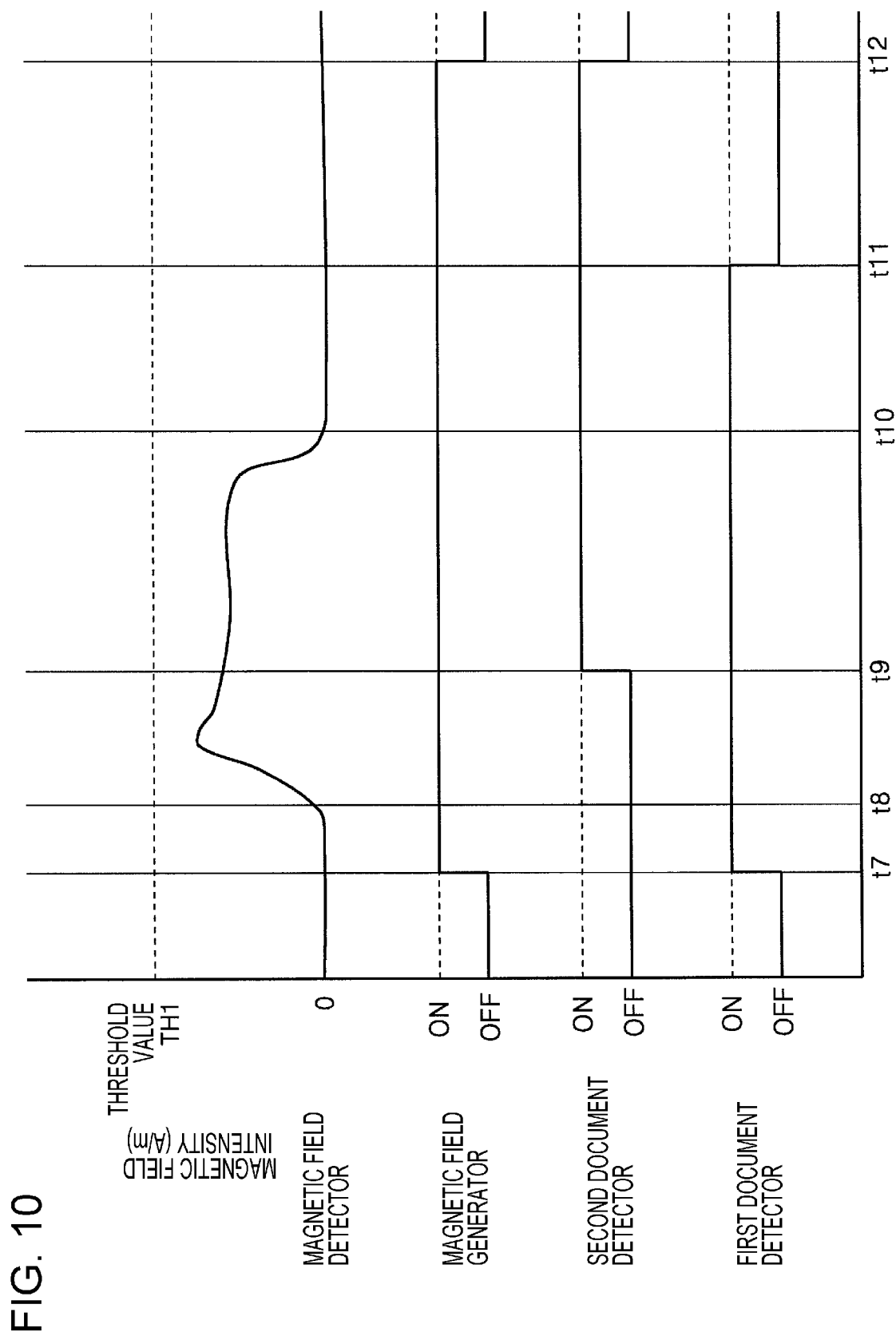
FIG. 10 is a time chart illustrating a state in which a metallic foreign object other than the binding member is detected in the binding member detecting operation.
Figure 11:
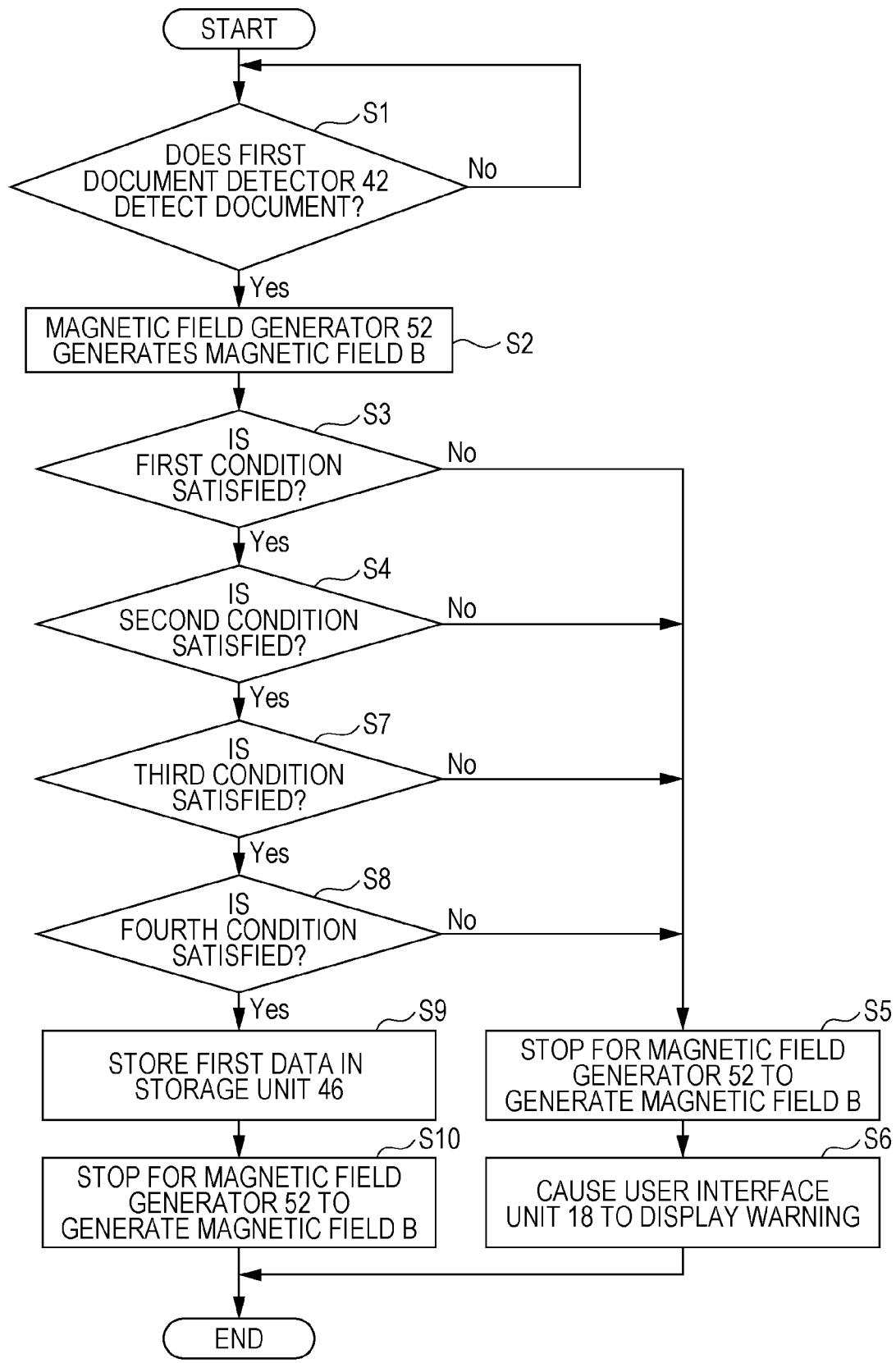
FIG. 11 is a flowchart illustrating a flow of binding member detecting control.
Figure 12:
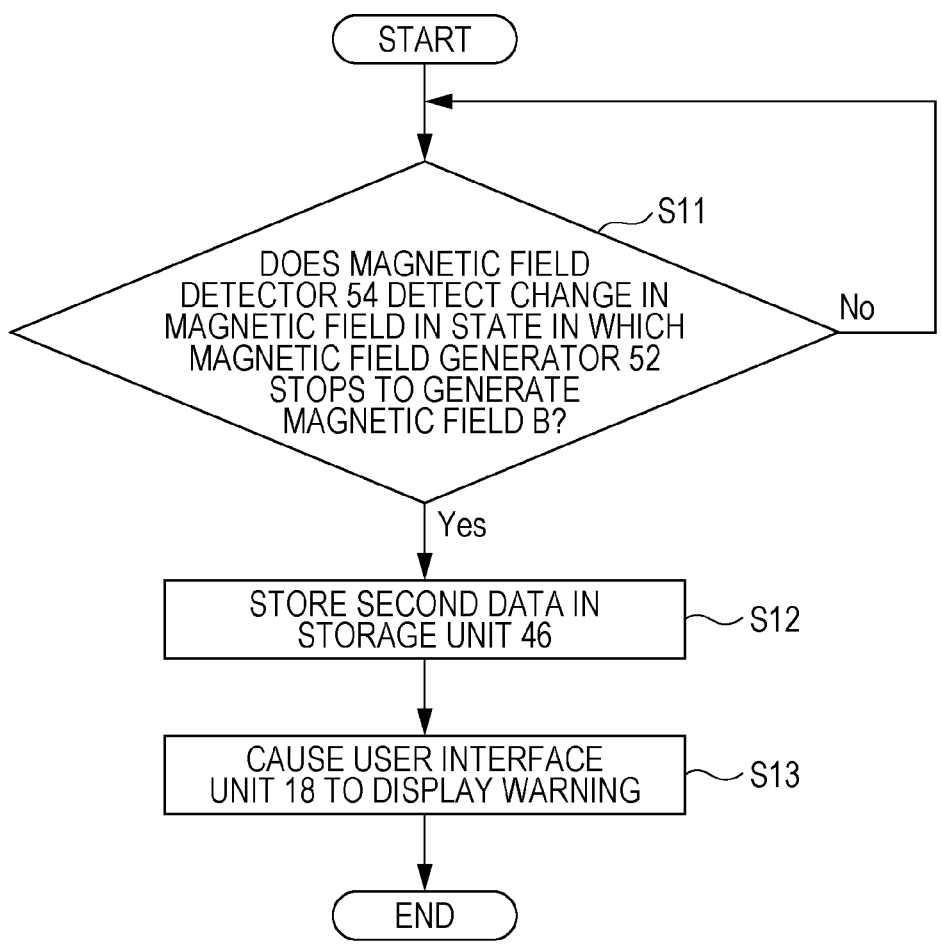
FIG. 12 is a flowchart illustrating a flow of control when detecting a disturbance.

FIG. 9 is a time chart illustrating a state in which a binding member is detected in the binding member detecting operation, FIG. 10 is a time chart illustrating a state in which a metallic foreign object other than the binding member is detected in the binding member detecting operation, FIG. 11 is a flow chart illustrating a flow of binding member detecting control, and FIG. 12 is a flow chart illustrating a flow of control when detecting a disturbance.

Figure 13:
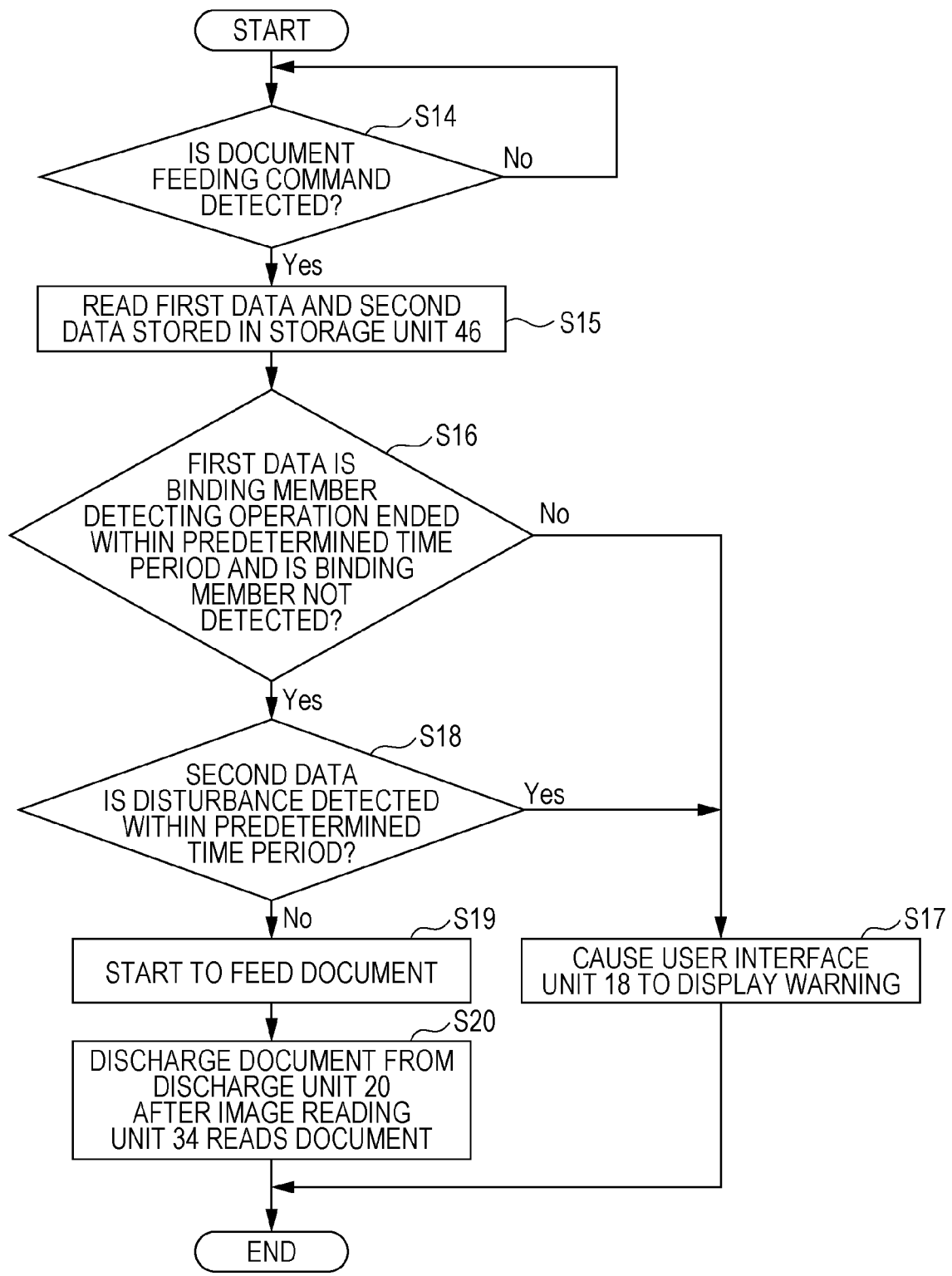
FIG. 13 is a flowchart illustrating a flow of image reading control.
Figure 14:
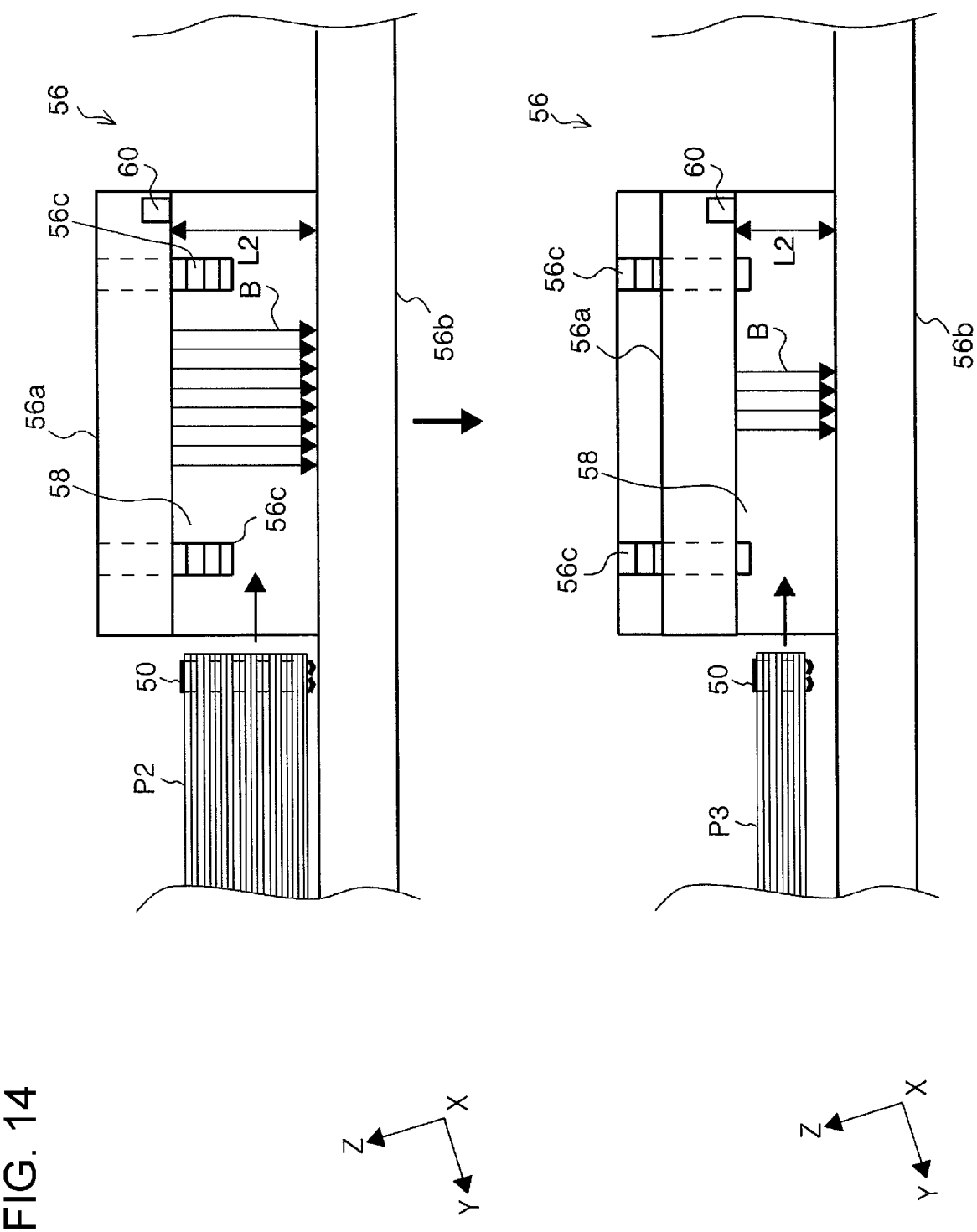
FIG. 14 is a side view illustrating a state in which an interval between a first portion and a second portion in the binding member detector is adjusted.
Figure 15:
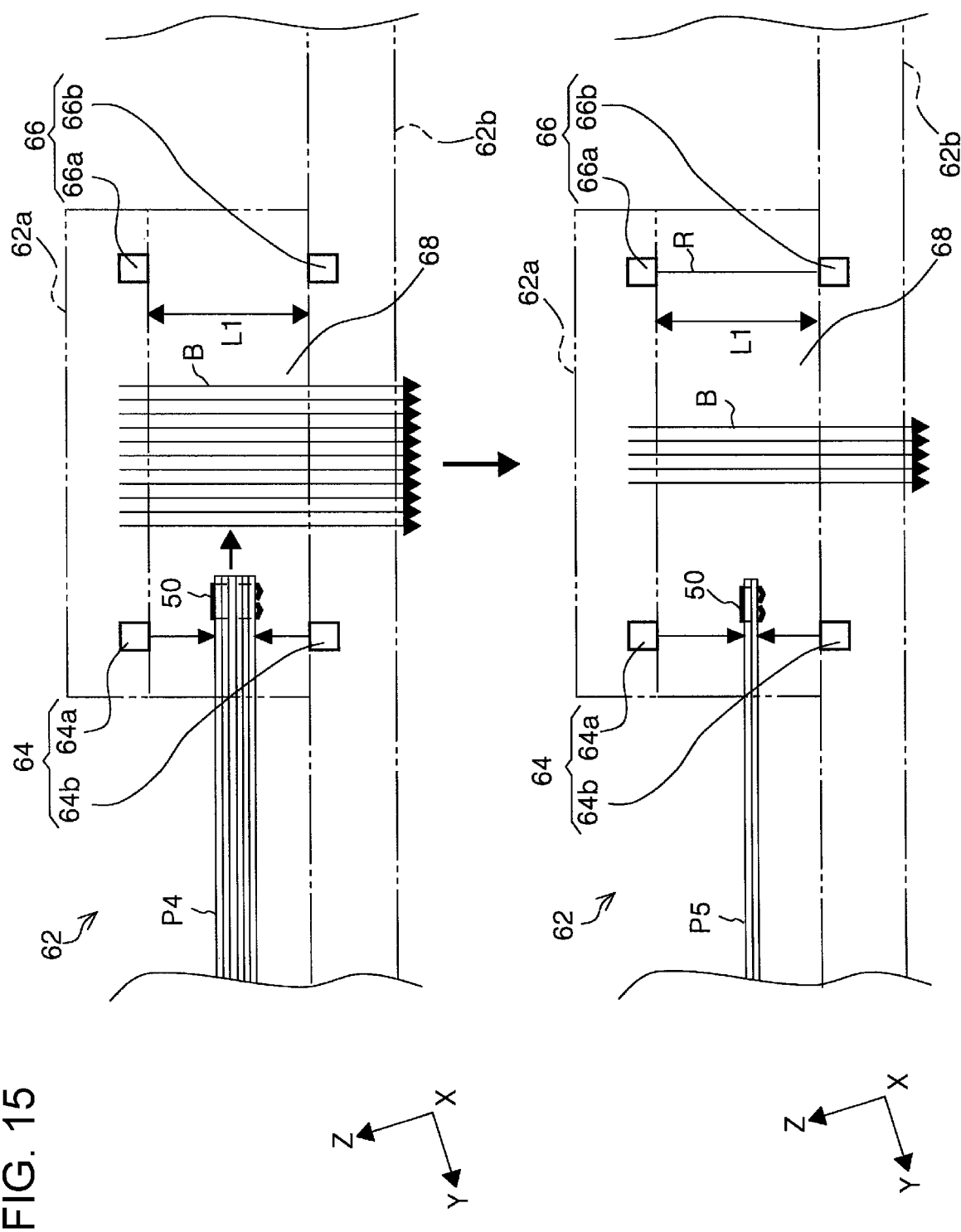
FIG. 15 is a schematic diagram illustrating a modification example of providing a sensor which measures a thickness of the document in the binding member detector.

FIG. 13 is a flow chart illustrating a flow of image reading control, FIG. 14 is a side view illustrating a state in which an interval between a first portion and a second portion in the binding member detector is adjusted, and FIG. 15 is a schematic diagram illustrating a modification example of providing a sensor which measures a thickness of the document in the binding member detector.

Figure 16:
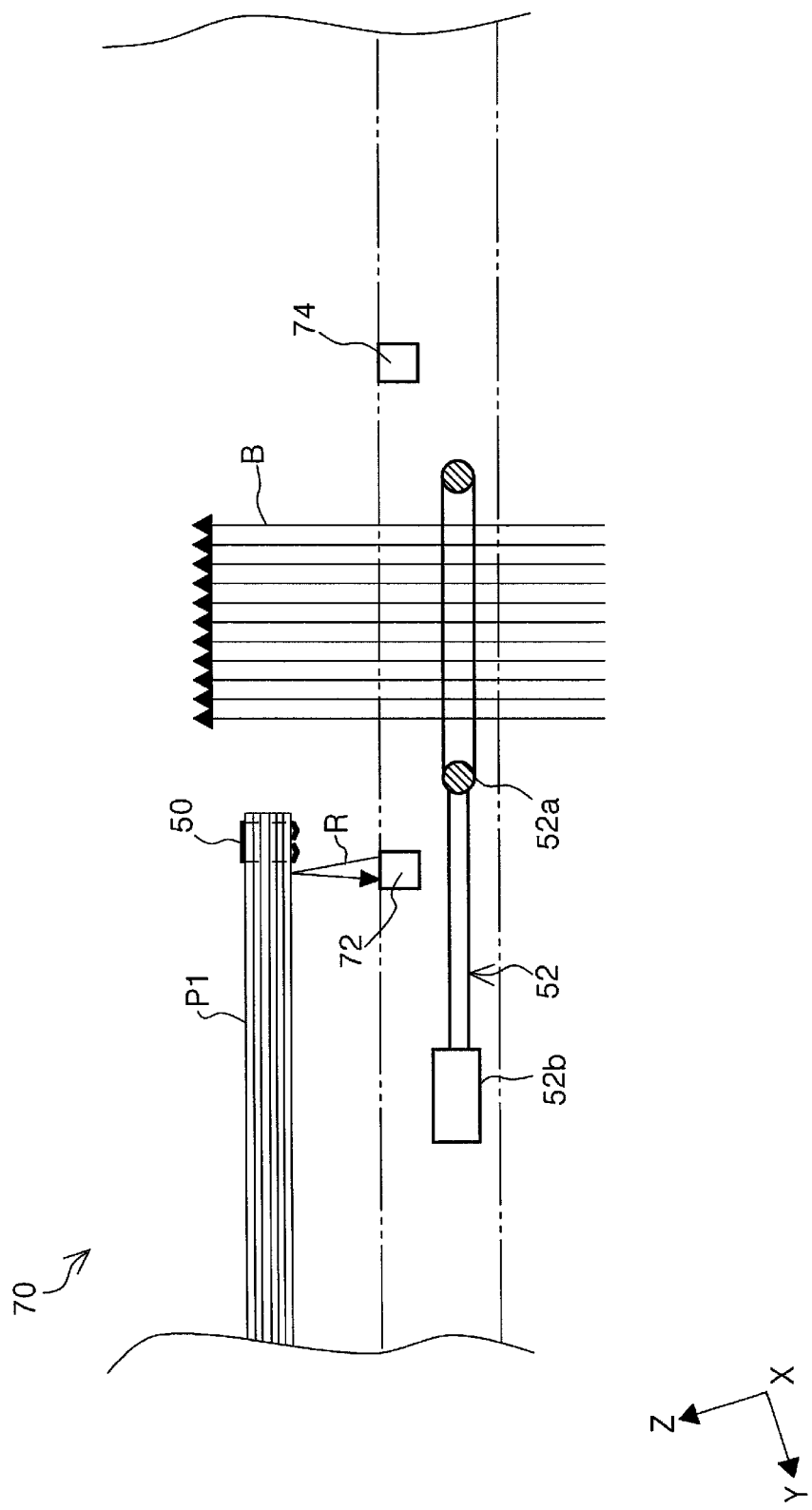
FIG. 16 is a schematic diagram illustrating a state in which a document detector detects the document according to the modification example.
Figure 17:
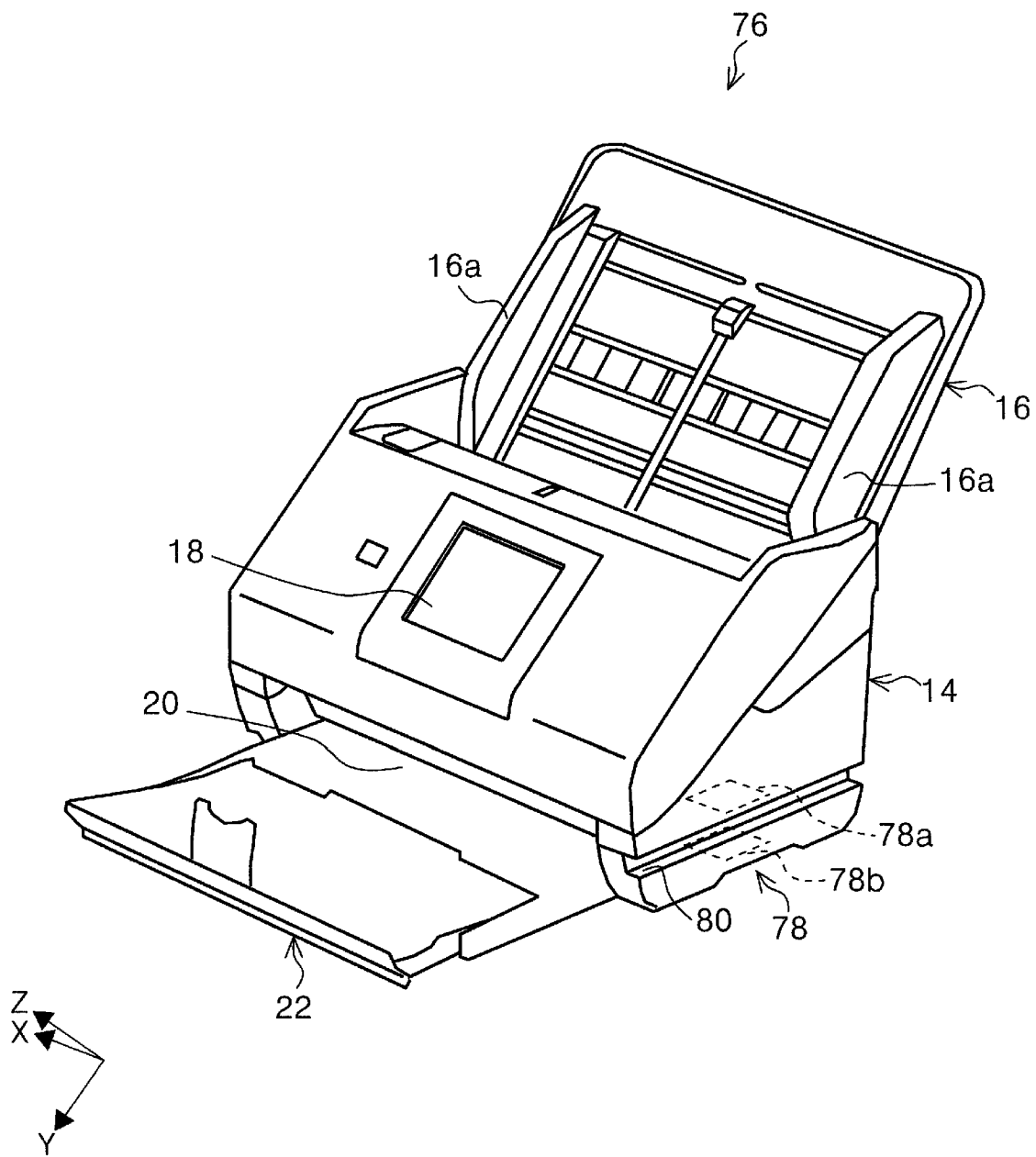
FIG. 17 is a perspective view illustrating the modification example of the binding member detector.
Figure 18:
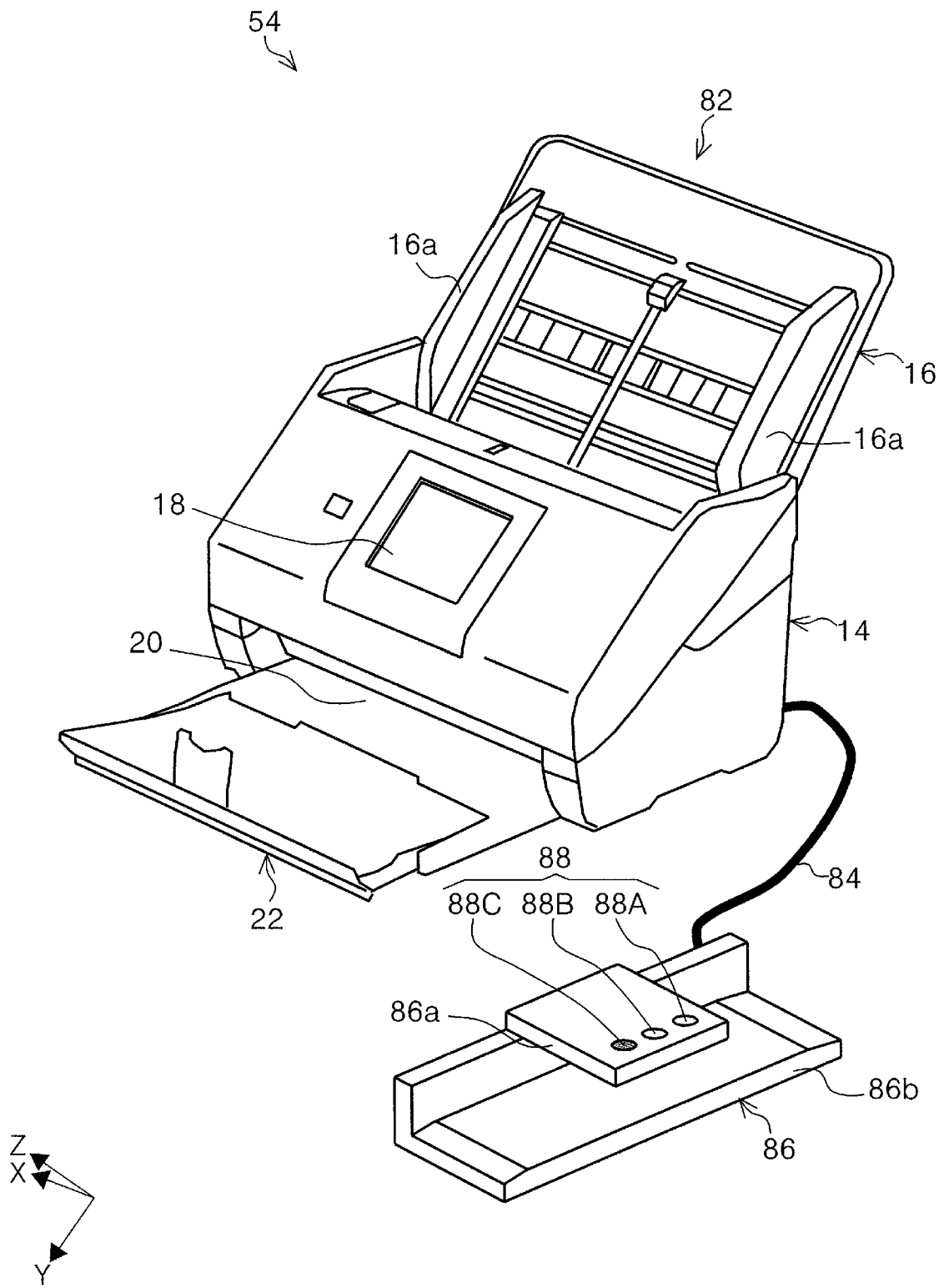
FIG. 18 is a perspective view illustrating a binding member detecting apparatus connected to the scanner.

FIG. 16 is a schematic diagram illustrating a state in which the document is detected in the modification example of a document detector, FIG. 17 is a perspective view illustrating the modification example of the binding member detector, and FIG. 18 is a perspective view illustrating a binding member detecting apparatus connected to the scanner.

In addition, in the X-Y-Z coordinate system illustrated in each of FIGS. 1 to 18, the X direction is an apparatus width direction and a medium width direction, the Y direction is a medium transport direction in an image reading apparatus, and the Z direction is a direction orthogonal to the Y direction and a direction roughly orthogonal to a surface of the medium transported. Further, in each of FIGS. 1 to 18, the +Y direction side is defined as a front surface side of the apparatus and the −Y direction side is defined as a rear surface side of the apparatus.

First Embodiment

Overview of Image Reading Apparatus

In FIG. 1, a scanner 10 will be described as an example of the image reading apparatus. The scanner 10 includes a main body portion 12 (see FIG. 2) and a housing 14 which covers the main body portion 12 and constitutes an external surface of the scanner 10.

A document setting unit 16 which sets the document is provided at an end of the main body portion 12 on a rear surface side of the apparatus. The document setting unit 16 is configured to be able to support the document in an inclined posture. A plurality of sheets of documents can be set in the document setting unit 16. The document setting unit 16 is provided with a pair of edge guides 16a which can be moved in directions to approach each other or in directions to depart from each other and is configured to guide a side portion of the document mounted in the document setting unit 16.

A user interface unit 18 is provided on a front surface side of the housing 14 of the scanner 10. For example, the user interface unit 18 is configured to include a touch panel and functions as a display unit and an operating unit. By operating the user interface unit 18, it is possible to execute reading operation of the medium of the scanner 10.

A discharge unit 20 is provided below the user interface unit 18 on a front surface side of the scanner 10. A document receiving unit 22 is provided below the discharge unit 20. In the present embodiment, the document receiving unit 22 is configured to switch between a state in which the document receiving unit 22 is in a lower part of the main body portion 12 and is stored inside the main body portion 12 (see FIG. 1) and a state in which the document receiving unit 22 is pulled out from the main body portion 12 to a front surface side (see FIG. 2). For example, a binding member detector 24 described below is provided on a side surface of the housing 14.

Document Transport Path

In FIG. 2, a document transport path 26 in the scanner 10 will be described. In FIG. 2, a bold solid line denoted by reference symbol P indicates a guide path of the document transported along the document transport path 26 in the scanner 10.

The main body portion 12 is provided with a document setting detection sensor 27 which detects setting of the document to the document setting unit 16, a feeding roller 28 as "document transport unit", a separating roller 30, a pair of transport rollers 32, an image reading unit 34 as "reading unit", and a pair of discharge rollers 36 from an upstream side (−Y direction side) to a downstream side (+Y direction side) in the transport direction of the document on a path of the document transport path 26 in the main body portion 12.

In the present embodiment, the feeding roller 28 is driven to rotate by a driving source (not illustrated) provided in the main body portion 12 as an example.

The separating roller 30 is provided to face the feeding roller 28. The separating roller 30 is provided in a state of being urged against the feeding roller 28 by an urging unit (not illustrated). The separating roller 30 is configured to separate the plurality of sheets of documents so as to transport only the lowest document to be fed to the downstream side in the transport direction when the plurality of sheets of documents insert between the feeding roller 28 and the separating roller 30. The document supported by the document setting unit 16 in an inclined posture is nipped between the feeding roller 28 and the separating roller 30 and is transported to the pair of transport rollers 32 disposed on the downstream side in the transport direction. Next, the pair of transport rollers 32 transports the document sent from the feeding roller 28 toward the image reading unit 34.

The image reading unit 34 includes a first reading unit 38A provided to face a lower surface of the document transported along the document transport path 26, that is, a first surface and a second reading unit 38B provided to face an upper surface of the document transported along the document transport path 26, that is, a second surface. In the present embodiment, the first reading unit 38A and the second reading unit 38B are configured as reading units and are configured as CISMs (contact type image sensor modules) as an example.

The image reading unit 34 reads an image in at least one of the first surface and the second surface of a document P send to the image reading unit 34 by the pair of transport rollers 32, then the document P is nipped by the pair of discharge rollers 36 positioned on the downstream side of the image reading unit 34 in the transport direction and is discharged from the discharge unit 20 to the document receiving unit 22.

Controller

A controller 40 will be described with reference to FIGS. 2 and 3. In present embodiment, the controller 40 is provided in the main body portion 12 illustrated FIG. 2. In present embodiment, the controller 40 is configured to include a plurality of electronic components as electric circuits. As illustrated in FIG. 3, the controller 40 controls reading operation of the first reading unit 38A and the second reading unit 38B, rotation driving of the feeding roller 28, the pair of transport rollers 32, and the pair of discharge rollers 36, and the binding member detector 24 and a first and a second document detectors 42 and 44 described below.

Further, the controller 40 includes a storage unit 46. The storage unit 46 is configured to temporally store information related to detecting operation of the document as an example described below. The controller 40 is configured to control transport of the document P, image reading operation, and binding member detecting operation in the scanner 10 as an example. In addition, the controller 40 may control operation required for executing document reading operation in the scanner 10 according to an instruction from an outside (such as PC).

Binding Member Detector

In FIGS. 4 and 5, a configuration of the binding member detector 24 and the first and the second document detectors 42 and 44 according to the present embodiment will be described. In FIG. 4, the binding member detector 24 includes a first portion 24a, a second portion 24b, and a connecting portion 24c. The first portion 24a and the second portion 24b face each other and are disposed to be spaced apart in an apparatus height direction of the scanner 10. In the present embodiment, the first portion 24a and the second portion 24b are connected by the connecting portion 24c. A cavity 48 for passing the document is formed between the first portion 24a and the second portion 24b. A guide surface 24e which guides a document bundle toward the cavity 48 is formed at each of both ends of an upper surface 24d of the second portion 24b in front/rear directions of the apparatus.

In the present embodiment, by passing the document bundle through the cavity 48, the binding member detector 24 detects a binding member 50 (see FIG. 4) which binds the document bundle. In addition, in the present embodiment, it is assumed the binding member 50 is a binding needle for a stapler formed from a metal member (for example, magnetic substance such as iron or the like).

In the present embodiment, a distance of the cavity 48 between the first portion 24a and the second portion 24b is set to a distance L1 (see FIG. 5). In the present embodiment, the distance L1 corresponds to a maximum loading height of the document settable in the document setting unit 16. Here, a fact that the distance L1 corresponds to the maximum loading height of the document settable in the document setting unit 16 is not limited to a fact that the distance L1 is exactly the same as the maximum loading height of the document settable in the document setting unit 16 and also means a fact that the distance L1 and the maximum loading height include some errors. Specifically, it is preferable to set the distance L1 to be slightly smaller than the maximum loading height of the document settable in the document setting unit 16. Accordingly, it is possible to more reliably prevent the document setting unit 16 from being set to the document having a height equal to or more than the maximum loading height.

As illustrated in FIG. 5, a magnetic field generator 52 is provided in the first portion 24a. The magnetic field generator 52 includes an oscillation coil 52a as "magnetic field generating coil" and an oscillation circuit 52b. The oscillation circuit 52b is electrically connected to the controller 40 and is controlled by the controller 40. For example, the oscillation coil 52a generates a magnetic field B (arrows of a plurality of virtual lines denoted by reference symbol B in FIG. 5) toward a magnetic field detector 54 provided on a side of the second portion 24b or stops to generate the magnetic field B according to a document detecting signal of the first and second document detectors 42 and 44 described below.

The magnetic field generated by the oscillation coil 52a is controlled by the controller 40 via the oscillation circuit 52b and oscillation frequency and oscillation strength can be changed. In the present embodiment, in a case where the document is not detected by the first and the second document detectors 42 and 44, the magnetic field generator 52 does not generate the magnetic field B. FIG. 5 illustrates a state in which the magnetic field B is not originally formed, but the magnetic field B is schematically formed.

For example, the magnetic field detector 54 includes a detecting coil 54a as "magnetic field receiving coil" and a galvanoscope 54b connected to both ends of the detecting coil 54a. In the present embodiment, the galvanoscope 54b is electrically connected to the controller 40. The galvanoscope 54b is configured to send a detecting signal to the controller 40 when detecting a change in the magnetic field B. The present embodiment may include the galvanoscope, but the present embodiment may include a pressure detector.

The magnetic field B (a plurality of arrows extended in a lower side direction in FIG. 5) generated from the oscillation coil 52a of the magnetic field generator 52 penetrates in a direction orthogonal to the detecting coil 54a. Since a magnetic flux Φ obtained by magnetic field B passing through the detecting coil 54a is changed, an electromagnetic induction phenomenon occurs and induced electromotive force is generated at both ends of the detecting coil 54a. In the present embodiment, a change in an induced current flowing by the induced electromotive force is detected by the galvanoscope 54b. In a case of the pressure detector, the pressure detector detects a change of the induced electromotive force.

Document Detector

When it is assumed that a left/right direction of a surface of the document is a document passage direction in FIG. 5, the first and the second document detectors 42 and 44 are disposed on both sides of the magnetic field generator 52 and the magnetic field detector 54. In the present embodiment, in FIG. 5, it is assumed that a left direction of the surface of the document is an upstream side in the document passage direction and a right direction of the surface of the document is a downstream side in the document passage direction. The first document detector 42 is provided on the upstream side of the magnetic field generator 52 and the magnetic field detector 54 in the document passage direction and the second document detector 44 is provided on the downstream side of the magnetic field generator 52 and the magnetic field detector 54 in the document passage direction. When passing the document through from a right side of the surface of the document, it is assumed that the right direction is the upstream side and the left direction is the downstream side.

In the present embodiment, the first document detector 42 and the second document detector 44 are configured as optical sensors and are configured as transmissive sensors as an example. For example, the first document detector 42 and the second document detector 44 include light emitting units 42a and 44a respectively provided at the first portion 24a and light receiving units 42b and 44b respectively provided at the second portion 24b. The first document detector 42 and the second document detector 44 are electrically connected with the controller 40 and are configured to transmit detecting signals to the controller 40.

For example, as illustrated in the upper diagram of FIG. 5, when a document bundle P1 is passed from a front surface side of the apparatus to a rear surface side of the apparatus via the cavity 48, the document bundle P1 crosses an optical axis R1 (fine line denoted by reference symbol R1 in FIGS. 5 to 8) between the light emitting unit 42a and the light receiving unit 42b in the first document detector 42. Accordingly, the first document detector 42 detects that the document bundle P1 is inserted in the cavity 48 and transmits the detecting signal to the controller 40.

Here, for example, as illustrated in the lower diagram of FIG. 6, when the document bundle P1 is passed from the front surface side of the apparatus to the rear surface side of the apparatus via the cavity 48, the document bundle P1 crosses an optical axis R1 between the light emitting unit 42a and the light receiving unit 42b in the first document detector 42 disposed on the upstream side at first. Accordingly, the first document detector 42 detects that the document bundle P1 is inserted in the cavity 48 and transmits the document detecting signal to the controller 40.

In the present embodiment, when receiving the document detecting signal from the first document detector 42, the controller 40 controls the oscillation circuit 52b of the magnetic field generator 52 for the oscillation coil 52a to generate the magnetic field B. Accordingly, preparation for detecting the binding member 50 in the binding member detector 24 is completed. When the document is passed through the cavity 48 from the downstream side, the second document detector 44 generates the document detecting signal and the controller 40 causes the oscillation coil 52a to generate the magnetic field B based on the document detecting signal of the second document detector 44.

Binding Member Detecting Operation

Next, the binding member detecting operation will be described with reference to FIGS. 6 to 9 and FIG. 11. As illustrated in the upper diagram of FIG. 6, a user starts the binding member detecting operation of the document and the document bundle P1 is passed through the cavity 48 of the binding member detector 24. In step S1 (see FIG. 11), the controller 40 monitors whether or not the first document detector 42 detects the document. In a case where the first document detector 42 does not detect the document, step S1 continues.

When the first document detector 42 detects the document in step S1, the process is moved to step S2. As illustrated in the lower diagram of FIG. 6, when the document bundle P1 crosses the optical axis R1 of the first document detector 42, the first document detector 42 becomes from an off-state to an on-state and transmits the document detecting signal toward the controller 40 at a timing t1 in FIG. 9. When receiving the document detecting signal, the controller 40 operates a timer (not illustrated) and the timer starts to count time.

Next, when receiving the document detecting signal from the first document detector 42, the controller 40 causes the magnetic field generator 52 to generate the magnetic field B in step S2. Specifically, as illustrated in FIG. 9, the magnetic field generator 52 is switched from the off-state to the on-state at the timing t1, so that the magnetic field B is generated from the oscillation coil 52a as illustrated in the upper diagram of FIG. 7.

First Condition

Hereinafter, in the present embodiment, the controller 40 determines whether or not first to fourth conditions are satisfied. First, in step S3, the controller 40 determines whether or not the first condition is satisfied. In the present embodiment, the first condition is satisfied in a case where the document is passed through the second document detector 44 within a predetermined time period. "Predetermined time period" in the first condition is referred to as "second time period".

Specifically, as illustrated in the upper diagram of FIG. 8, when the document crosses an optical axis R2 of the second document detector 44 within the predetermined time period, the second document detector 44 is switched from the off-state to the on-state and transmits the document detecting signal toward the controller 40 at a timing t4 in FIG. 9.

At this time, the controller 40 obtains elapsed time since the first document detector 42 detects the document (timing t1 in FIG. 9) until the second document detector 44 detects the document (timing t4 in FIG. 9) from the timer (not illustrated) and determines whether or not the obtained elapsed time is within the second time period. Here, the second time period is a setting time period to exclude a case where a passage speed of the document between the first document detector 42 and the second document detector 44 is too slow, for example, the second time period is set to a time period longer than a passage time period in a case where the document moves between the first document detector 42 and the second document detector 44 at the slowest assumed moving speed.

Here, in a case where the second document detector 44 does not detect the document within the second time period, that is, in a case where the passage speed of the document is too slow, it is concerned that the document is not correctly passed through a detecting region (cavity 48) in the binding member detector 24.

In the present embodiment, in a case of receiving the detecting signal from the second document detector 44 within the second time period, the controller 40 determines that the first condition is satisfied and the process is moved to step S4. In a case of receiving the detecting signal from the second document detector 44 beyond the second time period, the controller 40 determines that the first condition is not satisfied and the process is moved to step S5.

In step S5, the controller 40 stops for the magnetic field generator 52 to generate the magnetic field B. After then, the controller 40 stops and resets the timer (not illustrated) and displays a warning message (for example, "Binding member detecting operation is not normally ended. Check, please") or the like to the user interface unit 18 in step S6 as an example.

Second Condition

In a case of receiving the detecting signal from the second document detector 44 within the second time period, the controller 40 determines whether or not the second condition is satisfied in step S4. In the present embodiment, the second condition is satisfied in a case where the passage speed of the document in the binding member detector 24 is not too fast. "Predetermined time period" in the second condition is referred to as "first time period".

Specifically, it is determined whether or not the elapsed time, obtained in step S3, since the first document detector 42 detects the document (timing t1 in FIG. 9) until the second document detector 44 detects the document (timing t4 in FIG. 9) is equal to or larger than the first time period.

Here, the first time period is set to a time period longer than a detection time period (sampling time) during which a detection target can be detected at a detection position of the magnetic field detector 54. In addition, the first time period is set to a time period longer than a time period since the first document detector 42 can detect the document until the magnetic field detector 54 can detect a change in the magnetic field B.

In a case where the elapsed time (time difference) since the first document detector 42 detects the document (timing t1 in FIG. 9) until the second document detector 44 detects the document (timing t4 in FIG. 9) is less than the first time period, it can be determined that the moving speed of the document is too fast and there is a possibility of wrong detection or omission of detection.

In a case where the elapsed time (time difference) since the first document detector 42 detects the document (timing t1 in FIG. 9) until the second document detector 44 detects the document (timing t4 in FIG. 9) is less than the first time period (case where the passage speed of the document is too fast), the controller 40 determines that the second condition is not satisfied and the process is moved to step S5.

After then, the controller 40 stops for the magnetic field generator 52 to generate the magnetic field B and stops and resets the timer (not illustrated) and displays a warning message (for example, "Binding member detecting operation is not normally ended. Slowly send document and perform binding member detecting operation again, please") or the like to the user interface unit 18 in step S6 as an example.

In a case where the elapsed time (time difference) since the first document detector 42 detects the document (timing t1 in FIG. 9) until the second document detector 44 detects the document (timing t4 in FIG. 9) is equal to or more than the first time period (case where the passage speed of the document is too fast), the controller 40 determines that the second condition is satisfied and the process is moved to step S7.

Third Condition

In step S7, the controller 40 determines whether or not the third condition is satisfied. In the present embodiment, in a case where after the second document detector 44 detects the document, the first document detector 42 and the second document detector 44 end to detect the document within the predetermined time period, the third condition is satisfied. "Predetermined time period" in the third condition is referred to as "third time period". For example, the third time period is set to a time equal to or more than the second time period.

The end of the document detection by the first document detector 42 and the second document detector 44 will be described. In the first document detector 42 as an example, as illustrated in the upper diagram of FIG. 8, when a rear end of the document in a document moving direction is passed through the optical axis R1 of the first document detector 42, the first document detector 42 is switched from the on-state to the off-state at a timing t5 (see FIG. 9). Accordingly, the controller 40 determines that the document is passed through the first document detector 42.

In a case of the second document detector 44, as illustrated in the lower diagram of FIG. 8, the rear end of the document in the document moving direction is passed through the optical axis R2 of the second document detector 44, the second document detector 44 is switched from the on-state to the off-state at a timing t6 (see FIG. 9). Accordingly, the controller 40 determines that the document is passed through the second document detector 44.

In a case where the first document detector 42 and the second document detector 44 continue to detect the document even after the third time period elapses, it is considered that there is a high possibility that the document is left in the binding member detector 24 for some reason.

On the other hand, in a case where the first document detector 42 and the second document detector 44 does not end to detect the document within the third time period, the controller 40 moves to step S5. After then, the controller 40 stops for the magnetic field generator 52 to generate the magnetic field B and stops and resets the timer (not illustrated) and displays a warning message (for example, "Binding member detecting operation is not normally ended. Check, please") or the like to the user interface unit 18 in step S6 as an example.

On the other hand, in a case where after the second document detector 44 detects the document, the first document detector 42 and the second document detector 44 end to detect the document within the predetermined third time period, the controller 40 moves to step S8.

Fourth Condition

In step S8, the controller 40 determines whether or not the fourth condition is satisfied. In the present embodiment, the fourth condition is satisfied in a case where the binding member 50 is not detected.

Here, the detection of the binding member 50 will be described. As illustrated in the lower diagram of FIG. 7, when the document bundle P1 bound by the binding member 50 crosses the magnetic field B after the magnetic field generator 52 generates the magnetic field B in step S2, the magnetic field detector 54 detects a change in the magnetic field B.

Specifically, when a magnetic field intensity of the magnetic field starts to change from an initial state (set to "0" in FIG. 9) at a timing t2 (see FIG. 9), the magnetic field detector 54 starts to transmit a magnetic field change detecting signal and magnetic field intensity information to the controller 40. As illustrated in the upper diagram of FIG. 8, when the binding member 50 gets out of the magnetic field B, the magnetic field intensity decreases at a timing t3 (see FIG. 9) and returns to the initial state, and the magnetic field detector 54 stops to transmit the magnetic field change detecting signal and the magnetic field intensity information. In the present embodiment, in a case where the received magnetic field intensity information is more than a predetermined threshold value TH1, the controller 40 determines that the binding member 50 is detected.

In a case of determining that the binding member 50 is detected in step S8, the controller 40 moves to step S5. After then, the controller 40 stops for the magnetic field generator 52 to generate the magnetic field B and stops and resets the timer (not illustrated) and displays a warning message (for example, "Binding member is detected. Check, please") or the like to the user interface unit 18 in step S6 as an example.

In a case of determining that the binding member 50 is not detected in step S8, the controller 40 moves to step S9. In step S9, the controller 40 writes and stores first data which includes a time of the binding member detecting operation and a flag indicating that the binding member is not detected (normal detection data) in the storage unit 46.

After then, the controller 40 stops for the magnetic field generator 52 to generate the magnetic field B and ends the binding member detecting control in step S10.

Modification Example of Binding Member Detecting Operation

In the present embodiment, by the first condition and the second condition, suitability of the passage speed of a tip of the document between the first document detector 42 and the second document detector 44 is evaluated, in addition to this, the suitability of the passage speed of the rear end of the document may be evaluated in the same manner. In this case, if at least one of the passage speed of the tip of the document and the passage speed of the rear end of the document is inappropriate, detection of the binding member is inappropriate and the warning is displayed.

Disturbance Detection

Next, disturbance detection will be described with reference to FIG. 12. In the present embodiment, as illustrated in the upper diagram of FIG. 6, the magnetic field generator 52 is configured not to generate the magnetic field B in a state in which the first document detector 42 and the second document detector 44 do not detect the document (hereinafter, document undetected state). However, although the magnetic field B is not generated in the document undetected state, the magnetic field detector 54 may detect a change in the magnetic field due to a disturbance noise or the like.

In step S11 of FIG. 12, the controller 40 causes the magnetic field detector 54 to determine whether or not the magnetic field is changed in a state in which the magnetic field generator 52 stops to generate the magnetic field B and in a state in which the document is not detected.

In a case where the magnetic field detector 54 does not detect a change in the magnetic field, step S11 continues. In a case where the magnetic field detector 54 detects the change in the magnetic field, the process is moved to step S12. In step S12, the controller 40 writes and stores second data which includes a time of detecting the change in the magnetic field and change information on the magnetic field in the document undetected state in the storage unit 46.

After then, in step S13, the controller 40 notifies the user interface unit 18 of the warning as a predetermined process. Specifically, the controller 40 displays the warning message (for example, "Magnetic field change is detected. There may be disturbance noise. Check, please") or the like to the user interface unit 18.

More specifically, for example of the disturbance detection, the controller 40 causes to the magnetic field detector 54 to monitor the change in the magnetic field with an appropriate time interval in the document undetected state, that is, in the state in which the magnetic field B is not formed.

The controller 40 compares a result of detecting the magnetic field in the document undetected state with a result of detecting the magnetic field just before the data is stored in the storage unit 46, the magnetic field for past several times, or the magnetic field at the time of instrument calibration. In a case where the result of the magnetic field detected this time is different from the past result, that is, in a case where the magnetic field is changed as compared with the past state, the controller 40 is configured to generate the warning.

When receiving the warning, the user can move a disposition location of the scanner 10 or distance a source of the disturbance noise from the scanner 10. Further, after performing these processes, the user can detect the binding member in a state in which that the disturbance noise is not affected and can reduce the wrong detection.

In the present embodiment, the disturbance is detected based on the detection of the change of the magnetic field by the one magnetic field detector 54, but an exclusive magnetic field detector or the exclusive magnetic field detectors equal to or more than two (not illustrated) for detecting the disturbance noise may be provided. In this case, the exclusive magnetic field detection unit for detecting the disturbance noise is preferably disposed near the magnetic field detector 54 in the scanner 10. According to this configuration, since a detection result of the exclusive magnetic field detector approaches the change in the magnetic field applied to the magnetic field detector 54, it is possible to further increase accuracy of detection of the change in the magnetic field.

Control of Document Feeding

Next, control of document feeding in the scanner 10 will be described with reference to FIGS. 2 and 13. In step S14 of FIG. 13, the controller 40 determines whether or not a document feeding command input from the user interface unit 18 is detected. In a case of detecting the document feeding command, step S14 continues. In a case of not detecting the document feeding command, the controller 40 moves to step S15.

In step S15, the controller 40 reads the first data and the second data stored in the storage unit 46 from the storage unit 46. In step S16, by comparing a time at which the binding member detecting operation is performed most recently with a current time based on the read first data, the controller 40 checks whether the binding member detecting operation is ended within the predetermined time period and the binding member 50 is not detected.

In a case where a time equal to or more than the predetermined time (for example, 1 minute or more) elapses since the binding member detecting operation is performed most recently, the controller 40 moves to step S17. In step S17, the controller 40 displays the warning message (for example, "Set document after detecting binding member, please") or the like to the user interface unit 18.

In a case where it is checked that the binding member detecting operation is ended within the predetermined time period and the binding member 50 is not detected based on the first data, the controller 40 moves to step S18. In step S18, by comparing a time at which the disturbance is detected most recently with the current time based on the read second data, the controller 40 determines whether or not the elapsed time since the disturbance is detected most recently is equal to or more than the predetermined time period (for example, 30 minutes). In a case of checking the disturbance, the process is moved to step S17. In step S17, the controller 40 displays the warning message (for example, "Electromagnetic wave noise is detected. Check scanner periphery, please") or the like to the user interface unit 18.

In a case where it is checked that the disturbance is not detected in step S18, the controller 40 controls the feeding roller 28, the pair of transport rollers 32, and the pair of discharge rollers 36 and starts to feed the document set in the document setting unit 16 toward the image reading unit 34 in step S19.

Next, after the controller 40 causes the image reading unit 34 to read an image of the document, the controller 40 discharges the document from the discharge unit 20 to the document receiving unit 22.

Control of Foreign Object Detection Based on Magnetic Field Intensity Detection Information Next, foreign object detection of the binding member detecting operation will be described with reference to FIGS. 9 to 10. At first, the magnetic field will be described. The magnetic field generally includes a direct current (DC) magnetic field and an alternating current (AC) magnetic field. The DC magnetic field is a magnetic field formed by a magnet. When a magnetic substance such as iron (binding member 50) crosses the DC magnetic field, the magnetic field is changed, so that it is possible to detect the magnetic substance. When a conductor such as aluminum crosses the DC magnetic field, the magnetic field is little changed, so that it is not possible to detect the conductor.

On the other hand, the AC field is a magnetic field generated when an alternating current flows through a coil. When the magnetic substance such as iron (binding member 50) crosses the AC magnetic field, the magnetic field is changed, so that it is possible to detect the conductor. When the conductor such as aluminum crosses the DC magnetic field, an eddy current is generated in the magnetic field and characteristics of the eddy current are different from characteristics of the magnetic substance, so that it is possible to detect the magnetic substance. In the following description, not only the magnetic substance but also the conductor are detected. Therefore, the magnetic field generator 52 will be described as a generator of the AC magnetic field.

In the present embodiment, when the first document detector 42 detects that the tip of the document is passed (for example, timing t1 in FIG. 9), the controller 40 causes the magnetic field generator 52 to generate the magnetic field. When a metal object is passed through the magnetic field detector 54, the controller 40 detects a change in the magnetic field in a rectangular shape illustrated in FIG. 9.

As an example in FIGS. 9 and 10, the controller 40 distinguishes between the binding member 50 and another conductor by using a size in the document moving direction. In the present embodiment, the other conductor is a conductor attached to the document and is made of a metal material, for example, an aluminum seal, a tag seal, a hologram seal, or the like.

Hereinafter, the foreign object detection will be described in detail. In FIG. 5, an interval between the first document detector 42 and the second document detector 44 in the document moving direction is set to a distance L2. When the first document detector 42 detects the document (timing t1 in FIG. 9 or timing t7 in FIG. 10), the controller 40 causes the timer (not illustrated) to start counting time. Next, the controller 40 obtains the elapsed time since the first document detector 42 detects the document (timing t1 in FIG. 9) until the second document detector 44 detects the document (timing t4 in FIG. 9) from the timer.

Accordingly, a time period T since the document moves from the first document detector 42 until the second document detector 44 can be obtained. Further, by dividing the distance L2 between the first document detector 42 and the second document detector 44 by the time period T, a moving speed V (=L2/T) of the document is obtained. In the following description, the moving speed of the document bound by the binding member 50 and the moving speed of the document to which the conductor (aluminum seal or the like) is attached will be described as the same moving speed V.

In FIG. 9, the magnetic field detector 54 detects a change in the magnetic field at a timing t2 and the magnetic field detector 54 does not detect the change in the magnetic field at a timing t3. Here, a time period between the timings t2 and t3 corresponds to a time period during the binding member 50 is passed through the detecting region of the magnetic field detector 54. Therefore, by multiplying the moving speed V of the document and the timing t3–the timing t2, a size of the binding member 50 in the document moving direction, that is, (t3–t2)×V is obtained.

On the other hand, in FIG. 10, the magnetic field detector 54 detects the change in the magnetic field at a timing t8 and the magnetic field detector 54 does not detect the change in the magnetic field at a timing t10. Here, a time period between the timings t10 and t8 corresponds to a time period during the conductor (aluminum seal or the like) is passed through the detecting region of the magnetic field detector 54. Therefore, by multiplying the moving speed V of the document and the timing t10–the timing t8, a size of the conductor (aluminum seal or the like) in the document moving direction, that is, (t10–t8)×V is obtained.

In FIGS. 9 and 10, since the time period (t10–t8) during which the change in the magnetic field is detected in the case of the conductor (aluminum seal or the like) is longer as compared with the time period (t3–t2) during which the change in the magnetic field is detected in the case of the binding member 50, it is understood that the size of the conductor (aluminum seal or the like) in the document moving direction, that is, (t10–t8)×V is larger than the size of the binding member 50 in the document moving direction, that is, (t3–t2)×V. Therefore, in the binding member detecting control, by using the time period during the magnetic field is changed, it is possible to determine the size of the detected foreign object.

The binding member detecting control can be performed according to the size of the detected foreign object. For example, in a case where the magnetic field detector 54 detects a conductor other than the binding member, that is, a larger size (aluminum seal or the like) than the size of the binding member, it may be assumed that the fourth condition (step S8 in FIG. 11) described with reference to FIG. 11 is satisfied.

Here, in many cases, the conductor such as aluminum seal is attached to one sheet of the document. Therefore, since the document to which the conductor is attached is not bound to other documents, even if these documents are collectively fed by the scanner 10, in many cases, there is no influence on the document feeding. In this case, it is regarded that the binding member is not detected and the warning may be not notified.

Further, by displaying a caution saying a possibility that a conductor other than the binding member is detected, the user may check the document in which the conductor is detected and if there is no problem, the scanner 10 may control to feed the document. In this case, the controller 40 may display the caution including the warning message (for example, "foreign object other than binding member is detected. Check document, please") or the like to the user interface unit 18.

In the above description, the foreign object is detected by using a difference between the measured sizes of the magnetic substance and the conductor, in addition to this, the foreign object may be detected by using a difference between characteristics of the magnetic substance and the conductor during the magnetic field is changed in the AC magnetic field.

For example, for another control of detecting the foreign object, the controller 40 may determine whether or not the amount of changes of the magnetic field is larger than a predetermined threshold value to distinguish between the binding member 50 and the conductor other than the binding member 50. Specifically, as the amount of changes of the magnetic field in the case of the conductor other than the binding member 50 detected by the magnetic field detector 54 is different from the amount of changes of the magnetic field in the case of the binding member 50 which is a magnetic substance, the predetermined threshold value TH1 is set. In a case where the amount of changes exceeds the predetermined threshold value TH1, the controller 40 determines that the binding member 50 is detected. On the other hand, as illustrated in FIG. 10, in a case where the amount of changes does not exceed the predetermined threshold value TH1 even if the magnetic field intensity changes, the controller 40 determines that the conductor other than the binding member is detected. Therefore, it is possible to distinguish between the binding member 50 and the conductor other than the binding member 50 according to the amount of changes in the magnetic field.

Modification Example of Embodiment (1) Next, a binding member detector 56 (modification example of binding member detector 24) will be described with reference to FIG. 14. In the present embodiment, the distance L1 between the first portion 24a and the second portion 24b is fixed, but instead of this configuration, the distance L2 between a first portion 56a and a second portion 56b may be changeable. Specifically, a position adjusting unit 56c is provided in the first portion 56a or the second portion 56b and one of the first portion 56a and the second portion 56b may be displaceable in a direction to approach to or separate from the other of the first portion 56a and the second portion 56b. As an example, by the first portion 56a approaching the second portion 56b, it is possible to adjust the interval between the first portion 56a and the second portion 56b. The position adjusting unit 56c is configured of, for example, a guide mechanism, a link mechanism, or the like.

In the present modification example, in the upper diagram of FIG. 14, a distance of a cavity 58 between the first portion 56a and the second portion 56b is set to the distance L2. Further, since the position adjusting unit 56c causes the first portion 56a to approach the second portion 56b, the distance of the cavity 58 can be set to a distance L3 shorter than the distance L2. According to this configuration, in a case where the number of sheets of documents on which the binding member detecting operation is performed is small, it is possible to reduce a distance between the document and the magnetic field detector 54 and to ensure detection sensitivity.

Further, in the present modification example, there may be provided a distance measuring sensor 60 which measures a distance between the first portion 56a and the second portion 56b in the binding member detector 56 as "interval measuring unit". The distance measuring sensor 60 may be, for example, an optical or ultrasonic sensor. The oscillation strength of the magnetic field B generated by the magnetic field generator 52 may be adjusted according to the distance measured by the distance measuring sensor 60.

Specifically, in a case where the distance is long (case of distance L2), the oscillation strength of the magnetic field B may be strong and in a case where the distance is short (case of distance L3), the oscillation strength of the magnetic field B may be weak. According to this configuration, in a case where the number of sheets of documents on which the binding member detecting operation is performed is large (case where document bundle P2 is passed), the oscillation strength of the magnetic field B increases and in a case where the number of sheets of documents is small (case where document bundle P3 is passed), the oscillation strength of the magnetic field B decreases, so that it is possible to reduce power consumption and to reduce influence of the magnetic field on the outside. In FIG. 14, the magnetic field generator 52 and the magnetic field detector 54 are not illustrated and the magnetic field B is schematically illustrated.

(2) Next, a binding member detector 62 (modification example of binding member detector 24) will be described with reference to FIG. 15. The present modification example includes a first document detector 64 and a second document detector 66 as distance measuring sensors, that is, an example of "interval measuring unit". The first document detector 64 includes detection sensors 64a and 64b. In the same manner, the second document detector 66 includes detection sensors 66a and 66b. The detection sensor 64a is disposed on the upstream side of a first portion 62a and the detection sensor 66a is disposed on the downstream side of the first portion 62a. The detection sensor 64b is disposed on the upstream side of a second portion 62b and the detection sensor 66b is disposed on the downstream side of the second portion 62b.

When the document is passed through a cavity 68 between the first portion 62a and the second portion 62b, for example, the first document detector 64 on the upstream side detects the document. In the present modification example, for example, as illustrated in the upper diagram of FIG. 15, in a case where a document bundle P4 is passed, the detection sensor 64a measures a distance from an upper surface of the document bundle P4 and the detection sensor 64b measures a distance from a lower surface of the document bundle P4. By subtracting the distances respectively measured by the detection sensors 64a and 64b from the distance L1 of the cavity 68, a thickness of the document bundle P4 can be obtained.

Further, by using the distances respectively measured by the detection sensors 64a and 64b, it is possible to specify a position of the document bundle P4 in a direction (apparatus height direction) orthogonal to the document moving direction inside the cavity 68. Based on this, it is possible to adjust the oscillation strength of the magnetic field B according to the thickness of the document and the position of the document inside the cavity 68. Specifically, in a case of the document bundle P4 having the large number of sheets of documents, the oscillation strength of the magnetic field B can become strong and in a case of a document bundle P5 having the small number of sheets of documents, the oscillation strength of the magnetic field B can become weak. Even in a case where the document is inserted from a side of the second document detector 66, the magnetic field B is controlled in the same manner.

According to this configuration, it is possible to reduce power consumption and to reduce influence of the magnetic field on the outside. In FIG. 15, the magnetic field generator 52 and the magnetic field detector 54 are not illustrated and the magnetic field B is schematically illustrated.

(3) Next, a binding member detector 70 (modification example of binding member detector 24) will be described with reference to FIG. 16. The present modification example may be configured to include only the oscillation coil 52a on a side of the magnetic field generator 52 as a single coil resonance type not requiring the detecting coil 54a on a side of the magnetic field detector 54. In this configuration, a first document detector 72 and a second document detector 74 are configured as a reflective type of optical sensor.

(4) In the present embodiment, the first portion 24a are the second portion 24b in the binding member detector 24 protrude from a side surface of the housing 14. Instead of this configuration, as illustrated in FIG. 17, a scanner 76 is configured to include a first portion 78a and a second portion 78b in a binding member detector 78 disposed inside the main body portion 12 and a groove 80, disposed on the side surface of the housing 14 between the first portion 78a and the second portion 78b which face each other and extended from the front surface side of the apparatus to the rear surface side of the apparatus, of passing the document. According to this configuration, a side surface of the apparatus cannot be a protruding shape and it is possible to provide an aesthetically excellent configuration.

(5) In the present embodiment, the binding member detector 24 is provided on the side surface of the housing 14, but instead of this configuration, the binding member detector may be configured as a separate apparatus from the scanner. As illustrated in FIG. 18, a binding member detecting apparatus 86 is connected to a scanner 82 via a cable 84. The binding member detecting apparatus 86 fundamentally includes the same configuration as the binding member detector 24. In the present modification example, the cable 84 includes both a signal line and a power line as an example, but the signal line and the power line may be configured as separate cables. In addition, instead of the cable 84, a battery unit may be provided in the binding member detecting apparatus 86.

In the present modification example, the binding member detecting apparatus 86 includes a first portion 86a and a second portion 86b. A plurality of indicator lamps 88A, 88B, and 88C are provided on an upper part of the first portion 86a. In the present modification example, for example, when performing the binding member detecting operation, in a case where the document is normally passed and the binding member 50 is not detected, the indicator lamp 88A is lit in blue or green. Therefore, the user can visually check that the binding member 50 is not detected.

Further, for example, when performing the binding member detecting operation, in a case where the document is normally passed and the conductor (aluminum seal or the like) is detected, the indicator lamp 88B is lit in yellow. Therefore, the user can visually check that the conductor (aluminum seal or the like) is detected. In addition, for example, when performing the binding member detecting operation, in a case where the document is normally passed and the binding member 50 is detected, the indicator lamp 88C is lit in red. Therefore, the user can visually check that the binding member 50 is detected.

(6) In the present embodiment, the binding member detector 24 is configured to include the magnetic field generator 52 as a oscillation coil and the magnetic field detector 54 as a detecting coil, but instead of this configuration, the magnetic field generator 52 may be configured by a permanent magnet or an electromagnet and the magnetic field detector 54 may be a magnetic force detection sensor such as a Hall element.

(7) In the present embodiment, the first document detector 42 and the second document detector 44 are transmissive optical sensors, the light emitting units 42a and 44a are provided in the first portion 24a, and light receiving units 42b and 44b are provided in the second portion 24b, but instead of this configuration, light receiving units 42b and 44b may be provided in the first portion 24a and the light emitting units 42a and 44a may be provided in the second portion 24b.

(8) In the present embodiment, the binding member detector 24 is provided on the side surface of the housing 14, but instead of this configuration, the binding member detector 24 may be provided on a lower side of a tip of the document receiving unit 22 and the binding member detector 24 may be provided on an upper side of the discharge unit 20 on a front side of the housing 14.

(9) In the present embodiment, the binding member detector 24 is formed integrally on the side surface of the housing 14, but instead of this configuration, the binding member detector 24 may be configured to be attachable to the scanner 10.

(10) In the present embodiment, the distance L1 of the cavity 48 between the first portion 24a and the second portion 24b corresponds to the maximum loading height of the document settable to the document setting unit 16, but the embodiment is not limited thereto. The distance L1 may be shorter than the maximum loading height or longer than the maximum loading height.

(11) In the present embodiment, in a case where a target to be detected by the binding member detector 24 is limited to the binding member 50 (magnetic substance such as iron), the magnetic field generated in the binding member detector 24 may be the DC magnetic field.

The scanner 10 includes the image reading unit 34 which reads the document, the feeding roller 28 which transports the document P to the image reading unit 34, the binding member detectors 24, 56, 62, 70, 78, and 86 which detect the binding member 50 binding the document by detect a change in the magnetic field B when passing the document P, the first or second document detectors 42, 44, 64, 66, 72, and 74 which causes the binding member detectors 24, 56, 62, 70, 78, and 86 to detect that the document P is passed when passing the document P, and the controller 40 which receives the information on the document detected by the first or second document detectors 42 and 44 and the information on the change in the magnetic field detected by the binding member detector 24. In a case where the binding member detectors 24, 56, 62, 70, 78, and 86 detect the change in the magnetic field in the document undetected state in which the first or second document detectors 42, 44, 64, 66, 72, and 74 do not detect that the document is passed, the controller 40 performs a predetermined process.

According to this configuration, in the document undetected state in which the first or second document detectors 42, 44, 64, 66, 72, and 74 do not detect that the document is passed, in a case where the binding member detectors 24, 56, 62, 70, 78, and 86 detect the change in the magnetic field, that is, a case where the disturbance noise is detected, the controller 40 performs the predetermined process, for example, a process of displaying the warning message to the user interface unit 18, so that it is possible to further increase accuracy of detection of the binding member 50.

The predetermined process is a warning notification. According to this configuration, the warning is notified the user interface unit 18 in the case of detecting a disturbance noise, so that it is possible for the user to visually check an abnormal state, to urge the user to perform a retry operation, and it is further possible to appropriately detect the binding member 50.

The binding member detectors 24, 56, 62, 78, and 86 are configured to include the oscillation coil 52a which generates the magnetic field and the detecting coil 54a which receives the magnetic field generated by the oscillation coil 52a. The binding member detectors 24, 56, 62, 78, and 86 detect the change in the magnetic field in the document undetected state in which the oscillation coil 52a stops to generate the magnetic field. According to this configuration, it is possible to more reliably detect the change in the magnetic field in the document undetected state.

The first or second document detectors 42, 44, 64, 66, 72, and 74 are configured to include the binding member detectors 24, 56, 62, 78, and 86 in the document moving direction to the binding member detectors 24, 56, 62, 78, and 86, the first document detectors 42, 64, and 72 on the upstream side of the detection position at which the binding member 50 is detected, and the second document detectors 44, 66, and 74 on downstream side of the detection position. The controller 40 obtains a size of the object detected by the binding member detectors 24, 56, 62, 78, and 86 in the moving direction based on the information on the document detected by the first or second document detectors 42, 44, 64, 66, 72, and 74 and the information on the change in the magnetic field detected by the binding member detectors 24, 56, 62, 78, and 86.

According to this configuration, since the first or second document detectors 42, 44, 64, 66, 72, and 74 are configured to include the first document detectors 42, 64, and 72 on the upstream side of the detection position of the binding member detectors 24, 56, 62, 78, and 86 and the second document detectors 44, 66, and 74 on the downstream side of the detection position, it is possible to calculate the passage speed of the document at the detection position. Since the controller 40 obtains the size of the object detected by the binding member detectors 24, 56, 62, 78, and 86 in the moving direction based on the information (that is, passage speed of document) on the document detected by the first or second document detectors 42, 44, 64, 66, 72, and 74 and the information on the change in the magnetic field detected by the binding member detectors 24, 56, 62, 78, and 86, it is possible to distinguish between the object (for example, aluminum seal) with which the document is normally transported and read in the scanners 10, 76, and 82 and the object (for example, binding member 50) with which the document is not normally transported and read in the scanners 10, 76, and 82 and to effectively use a result for later control.

After the first document detectors 42, 64, and 72 detect the document, the binding member detectors 24, 56, 62, 78, and 86 cause the oscillation coil 52a to form the magnetic field B. According to this configuration, by minimizing the magnetic field B formed by the oscillation coil 52a, it is possible to suppress that the magnetic field has a bad influence on the scanners 10, 76, and 82 or a peripheral of the scanners 10, 76, and 82.

After the document undetected state in which any one of the first document detectors 42, 64, and 72 and the second document detectors 44, 66, and 74 does not detect the document, the binding member detectors 24, 56, 62, 78, and 86 cause the oscillation coil 52a to stop forming the magnetic field B. According to this configuration, by minimizing the magnetic field B formed by the oscillation coil 52a, it is possible to suppress that the magnetic field has a bad influence on the scanners 10, 76, and 82 or the peripheral of the scanners 10, 76, and 82.

In a case where the time difference between the timings t1 or t7 at which the first document detectors 42, 64, and 72 detect the document and the timing t4 or a timing t9 at which the second document detectors 44, 66, and 74 detect the document is smaller than the first time period, the controller 40 notifies a warning. In a case where the time difference between the timings t1 or t7 at which the first document detectors 42, 64, and 72 detect the document and the timing t4 or a timing t9 at which the second document detectors 44, 66, and 74 detect the document is smaller than the first time period, that is, a case where the passage speed of the document in the binding member detectors 24, 56, 62, 78, and 86 is too fast, it is concerned that the binding member 50 is not appropriately detected. According to this configuration, since the warning is notified in such a case, it is possible to urge the user to perform a retry operation and it is further possible to appropriately detect the binding member 50.

In a case where the second document detectors 44, 66, and 74 do not detect the document within the second time period after the first document detectors 42, 64, and 72 detect the document, the controller 40 notifies the warning. In a case where the second document detectors 44, 66, and 74 do not detect the document within the second time period after the first document detectors 42, 64, and 72 detect the document, for example, it is concerned that the document is not correctly passed through the detecting region by the binding member detectors 24, 56, 62, 78, and 86. According to this configuration, since the warning is notified in such a case, it is possible to urge the user to perform a retry operation and it is further possible to appropriately detect the binding member 50.

The scanner 10 includes the image reading unit 34 which reads the document, the feeding roller 28 which transports the document to the image reading unit 34, the binding member detector 56 which detect the binding member 50 binding the document by detect the change in the magnetic field. The binding member detector 56 includes the first portion 56a and the second portion 56b disposed to face the first portion 56a. The scanner 10 is configured to detect the binding member 50 by passing the document through between the first portion 56a and the second portion 56b and to be capable of adjusting the interval between the first portion 56a and the second portion 56b. According to this configuration, it is possible to adjust an output (for example, magnetic field B formed by oscillation coil 52a) so as to detect the binding member 50. As a result, for example, by decrease the interval, it is possible to weaken the magnetic field and to suppress that the magnetic field has a bad influence on the scanner 10 or the peripheral of the scanner 10.

The scanner 10 includes the distance measuring sensor 60 which measures the interval or the first document detector 64 and the second document detector 66. The binding member detectors 56 and 62 include the oscillation coil 52a which generates the magnetic field B and adjusts the intensity of the magnetic field B based on the interval measured or detected by the distance measuring sensor 60 or the first document detector 64 and the second document detector 66. According to this configuration, since the intensity of the magnetic field B is set according to the interval, it is possible to prevent the magnetic field B from being stronger than necessary and to suppress that the magnetic field has a bad influence on the scanner 10 or the peripheral of the scanner 10.

The binding member detectors 24, 56, 62, 70, and 78 are provided integrally with the main body portion 12 including the image reading unit 34.

The invention is not limited the embodiments described above. Various modifications are possible within the scope of the invention and the various modifications are also included in the scope of the invention.

The entire disclosure of Japanese Patent Application No. 2017-127615, filed Jun. 29, 2017 is expressly incorporated by reference herein.

What is claimed is:

1. An image reading apparatus comprising:
   a reading unit that reads a document;
   a document transport unit that transports the document toward the reading unit;
   a binding member detector that detects a binding member binding the document by detecting a change in a magnetic field when the document passes through the magnetic field;
   a document detector that detects passage of the document when the document passes through the binding member detector; and
   a controller that receives information on the document detected by the document detector and information on the change in the magnetic field detected by the binding member detector,
   wherein the controller is configured to monitor the information on the change in the magnetic field when a magnetic field generator included in the binding member detector is operating and when the magnetic field generator is not operating,
   wherein the magnetic field generator does not operate when the passage of the document is not detected,
   wherein if the binding member detector detects the change in the magnetic field without detecting the passage of the document, the controller executes a predetermined process.

2. The image reading apparatus according to claim 1, wherein the predetermined process is to perform notification of a warning.

3. The image reading apparatus according to claim 1, wherein the binding member detector is configured to include a magnetic field generating coil that generates the magnetic field and a magnetic field receiving coil that receives the magnetic field generated by the magnetic field generating coil, and
   the binding member detector detects the change in the magnetic field in the document undetected state in a state in which the magnetic field generating coil stops to form the magnetic field.

4. The image reading apparatus according to claim 3, wherein the document detector is configured to include a first document detector on an upstream side and a second document detector on a downstream side of a detection position at which the binding member detector detects the binding member in a moving direction of the document to the binding member detector, and
   the controller calculates a size of an object to be detected by the binding member detector in the moving direction based on the information on the document detected by the document detector and the information on the change in the magnetic field detected by the binding member detector.

5. The image reading apparatus according to claim 4, wherein the binding member detector causes the magnetic field generating coil to form the magnetic field after the first document detector detects the document.

6. The image reading apparatus according to claim 4, wherein the binding member detector causes the magnetic field generating coil to stop forming the magnetic field after the document undetected state in which both of the first document detector and the second document detector do not detect the document.

7. The image reading apparatus according to claim 4, wherein in a case where a time difference between a timing at which the first document detector detects the document and a timing at which the second document detector detects the document is smaller than a first time period, the controller performs notification of a warning.

8. The image reading apparatus according to claim 4, wherein in a case where the second document detector does not detect the document within a second time period after the first document detector detects the document, the controller notifies a warning.

9. The image reading apparatus according to claim 1, wherein an apparatus main body including the reading unit is provided integrally with the binding member detector.

10. An image reading apparatus comprising:
    a reading unit that reads a document;
    a document transport unit that transports the document toward the reading unit; and
    a binding member detector that detects a binding member binding the document by detecting a change in a magnetic field,
    wherein the binding member detector includes a first portion and a second portion disposed to face the first portion to form a cavity therebetween and is configured to detect the binding member by passing the document through the cavity between the first portion and the second portion and to be capable of adjusting an interval between the first portion and the second portion to change the cavity;
    an interval measuring unit that measures the interval,
    wherein the binding member detector includes a magnetic field generating coil that generates the magnetic field and adjusts an intensity of the magnetic field based on the interval measured by the interval measuring unit.

* * * * *